US010019854B1

(12) United States Patent
McQuillen et al.

(10) Patent No.: US 10,019,854 B1
(45) Date of Patent: Jul. 10, 2018

(54) METHODS AND SYSTEMS TO DETECT OXYGEN SENSOR DEGRADATION DUE TO SEALANT OFF-GASSING

(71) Applicant: Ford Global Technologies, LLC, Dearborn, MI (US)

(72) Inventors: Michael McQuillen, Warren, MI (US); Daniel A. Makled, Dearborn, MI (US); Richard E. Soltis, Saline, MI (US); Gopichandra Surnilla, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/453,810

(22) Filed: Mar. 8, 2017

(51) Int. Cl.
*F02D 41/14* (2006.01)
*G07C 5/08* (2006.01)
*G01M 15/10* (2006.01)

(52) U.S. Cl.
CPC ....... *G07C 5/0808* (2013.01); *F02D 41/1495* (2013.01); *G01M 15/104* (2013.01)

(58) Field of Classification Search
CPC . G07C 5/0808; G07C 5/0816; G01M 15/104; G01M 15/102; G02D 41/1495; G02D 41/1496; G02D 41/18; G02D 41/182; G02D 41/185; G02D 41/187; G02D 41/22; F02D 2041/224; F02D 2041/225; F02D 2041/227; F02D 2041/228

USPC ...... 701/31.4, 34.4, 29.1; 73/114.73, 114.72, 73/114.71, 23.32
See application file for complete search history.

(56) References Cited

U.S. PATENT DOCUMENTS

| | | | |
|---|---|---|---|
| 5,753,800 A * | 5/1998 | Gilliam | G01M 3/025 73/40.7 |
| 6,382,013 B1 | 5/2002 | Zarkhin et al. | |
| 6,427,527 B1 * | 8/2002 | Langer | F02D 41/18 73/114.25 |
| 6,739,177 B2 | 5/2004 | Sato et al. | |
| 9,181,887 B2 | 11/2015 | Surnilla et al. | |
| 2001/0010220 A1 * | 8/2001 | Shinjyo | F02D 41/1441 123/690 |
| 2011/0314893 A1 * | 12/2011 | Masui | G01N 27/4067 73/1.06 |
| 2012/0102917 A1 * | 5/2012 | Gibson | G01N 27/4067 60/273 |

* cited by examiner

*Primary Examiner* — Lindsay Low
*Assistant Examiner* — George Jin
(74) *Attorney, Agent, or Firm* — Julia Voutyras; McCoy Russell LLP

(57) ABSTRACT

Methods and systems are provided for detecting exhaust gas oxygen sensor degradation due to sealant off-gassing. In one example, a method may include indicating exhaust gas oxygen sensor degradation due to sealant off-gassing responsive to a change in fueling demand without a change in driver-demanded torque after a threshold exhaust temperature has been reached. In response to the indication, a measurement correction may be learned and applied to measurements of the exhaust gas oxygen sensor in order to accurately determine an air-fuel ratio of the exhaust.

19 Claims, 9 Drawing Sheets

METHODS AND SYSTEMS TO DETECT OXYGEN SENSOR DEGRADATION DUE TO SEALANT OFF-GASSING

FIELD

The present description relates generally to exhaust gas oxygen sensors of an internal combustion engine.

BACKGROUND/SUMMARY

An oxygen sensor, such as a universal exhaust gas oxygen (UEGO) sensor, may be positioned in an exhaust system of a vehicle to detect an air-fuel ratio (AFR) of exhaust gas from an internal combustion engine of the vehicle. The oxygen sensor readings may be used to adjust operation of the internal combustion engine, for example, by altering an amount of fuel injected in order to reach a desired AFR. Therefore, degradation of the oxygen sensor may result in degraded fuel injection control, which may lead to increased emissions, reduced vehicle drivability, and reduced fuel economy.

Oxygen sensors are often installed using a sealant, for example, a silicone sealant. However, exhaust gas may reach a temperature that is hot enough to cause the sealant to release gases—a phenomenon known as "off-gassing." Sealant off-gassing may degrade the oxygen sensor by interfering with oxygen concentration measurements. In contrast to generic degradation, for example, due to sensor aging, degradation due to sealant off-gassing may be rapid.

Other attempts to address oxygen sensor degradation due to sealant off-gassing include applying a bias voltage to adjust a measurement output of the oxygen sensor. One example approach is shown by Zarkhin et al. in U.S. Pat. No. 6,382,013 B1. Therein, degradation due to sealant off-gassing is detected by an inversion of the measurement output (e.g., from positive volts to negative volts), and the measurement output is adjusted using a predetermined bias voltage applied to a sensor return. The inventors therein note that the absolute value of the sensor measurement remains accurate despite the inversion.

However, the inventors herein have recognized potential issues with such methods. As one example, sealant off-gassing may cause the oxygen sensor to read rich (e.g., due to the released gases diluting the concentration of oxygen in the exhaust gas) or lean (e.g., due to sealant gases coating the sensor). Therefore, the effects of sealant off-gassing may be more complex than causing an inversion in oxygen sensor output voltage.

In one example, the issues described above may be addressed by a method comprising, responsive to a change in a demand for fueling an engine without a change in demand for engine output at an engine exhaust gas temperature greater than a threshold temperature, indicating degradation of an exhaust gas oxygen sensor, connected to an exhaust system of the engine with a sealant, due to sealant off-gassing; and correcting measurements of the exhaust gas oxygen sensor in response to the indication. In this way, oxygen sensor degradation due to sealant off-gassing may be identified, and the oxygen sensor measurements may be compensated.

As one example, indicating degradation of the exhaust gas oxygen sensor due to sealant off-gassing further comprises indicating exhaust gas oxygen sensor degradation due to sealant off-gassing without sensor coating when the exhaust gas oxygen sensor measures a rich air-fuel ratio of the engine exhaust gas coupled with a decreased fueling demand and indicating exhaust gas oxygen sensor degradation due to sealant off-gassing with sensor coating when the exhaust gas oxygen sensor measures a lean air-fuel ratio of the engine exhaust gas coupled with an increased fueling demand. In this way, degradation due to off-gassing without sensor coating may be distinguished from degradation due to the exhaust gas oxygen sensor becoming coated with sealant gasses. Although oxygen measurements made by an exhaust gas oxygen sensor degraded due to sealant off-gassing without sensor coating may be corrected in the same way as oxygen measurements made by an exhaust gas oxygen sensor degraded due to sealant off-gassing with sensor coating, exhaust gas oxygen sensor degradation due to sealant off-gassing with sensor coating may be irreversible. Therefore, it is advantageous to distinguish between the two forms of degradation due to sealant off-gassing (e.g., with and without sensor coating) to identify when sensor replacement is indicated.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
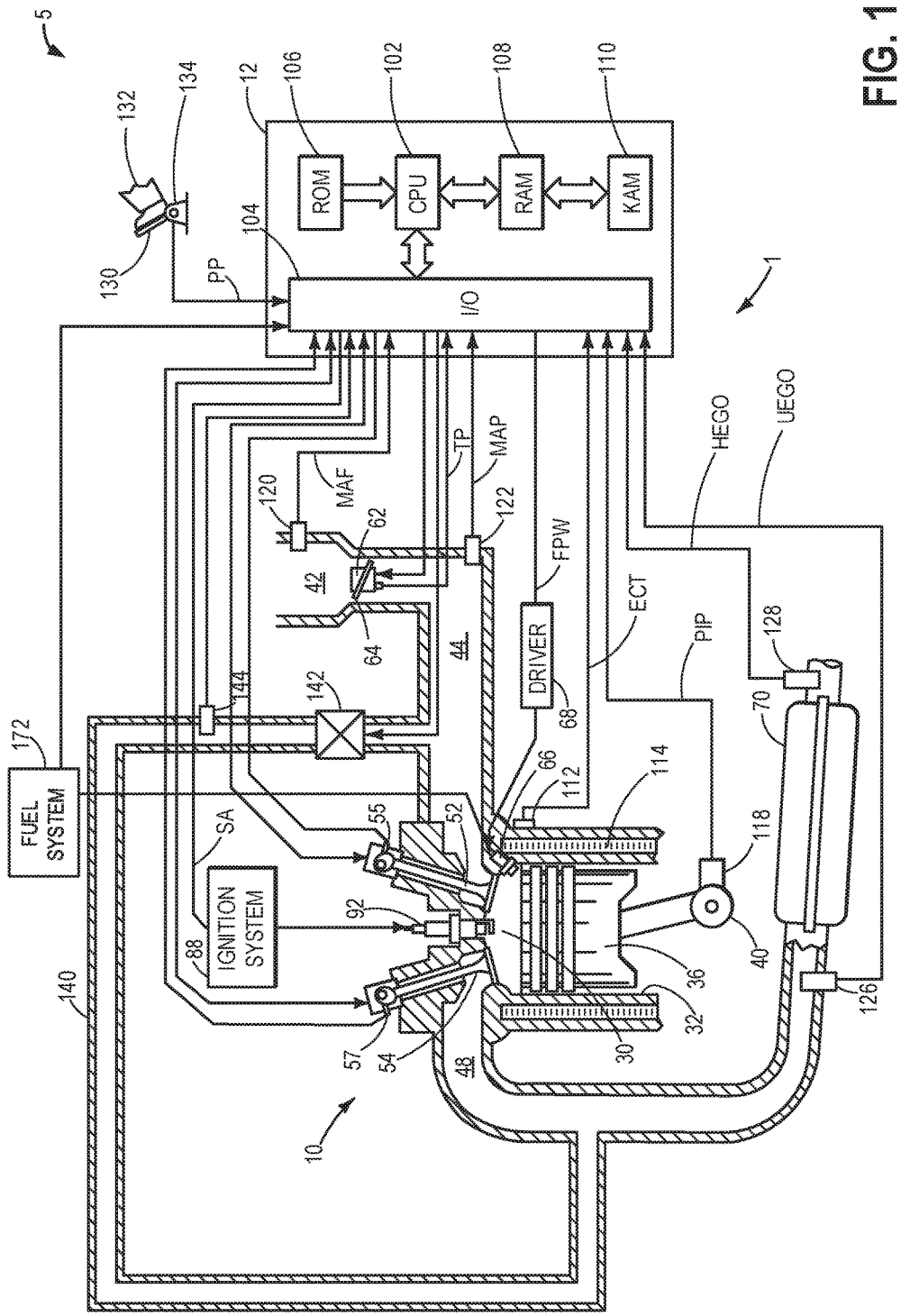
FIG. 1 shows a schematic depiction of an engine system of a vehicle.

The following description relates to systems and methods for determining exhaust gas oxygen sensor degradation due to sealant off-gassing in an engine system of a vehicle and applying a correction to the sensor measurement. As shown in FIG. 1, the engine system may include an exhaust gas oxygen sensor upstream of an emission control device. The upstream exhaust gas oxygen sensor may be a UEGO sensor, such as the example UEGO sensor diagrammed in FIG. 2, configured to measure the amount of oxygen in the exhaust gas. Engine operation may be controlled based on feedback from the UEGO sensor, as shown in FIG. 3, in order to achieve a desired AFR. Sealant off-gassing may degrade the UEGO sensor, causing it to read inappropriately rich (due to hydrocarbons released from the sealant) or lean (due to the sensor becoming coated with sealant), as may be determined according to the example method of FIG. 4. As part of determining exhaust gas oxygen sensor degradation due to sealant off-gassing, fuel injector degradation and MAF sensor degradation may be previously ruled out according to the example methods of FIGS. 5 and 6, respectively. Further, exhaust gas oxygen sensor degradation due to sealant off-gassing results in distinct degradation behavior from exhaust gas oxygen sensor degradation due to factors such as aging, which may be determined using the example method of FIG. 7. A measurement correction may be learned and applied responsive to an indication of exhaust gas oxygen sensor degradation due to sealant off-gassing, according to the example method of FIG. 8. FIG. 9 shows an example timeline for diagnosing exhaust gas oxygen sensor degradation due to sealant off-gassing (with and without sensor coating) and applying the measurement correction.

FIG. 1 illustrates a schematic diagram showing one cylinder of multi-cylinder engine 10, which may be included in an engine system 1. Engine system 1 may be a propulsion system included in a motor vehicle 5. Engine 10 may be controlled at least partially by a control system, including a controller 12, and by input from a vehicle operator 132 via an input device 130. In this example, input device 130 includes an accelerator pedal and a pedal position sensor 134 for generating a proportional pedal position signal PP. Combustion chamber (e.g., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from an intake manifold 44 via an intake passage 42 and may exhaust combustion gases via an exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two more exhaust valves. In this example, intake valve 52 and exhaust valve 54 may be controlled by cam actuation via one or more cams and may utilize one or more of cam profile switching (CPS), variable cam timing (VCT), variable valve timing (VVT), and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

In some embodiments, each cylinder of engine 10 may be configured with one or more fuel injectors for providing fuel thereto. As a non-limiting example, cylinder 30 is shown including one fuel injector 66, which is supplied fuel from a fuel system 172. Fuel injector 66 is shown coupled directly to cylinder 30 for injecting fuel directly therein in proportion to the pulse width of signal FPW received from controller 12 via an electronic driver 68. In this manner, fuel injector 66 provides what is known as direct injection (hereafter also referred to as "DI") of fuel into combustion cylinder 30.

It will be appreciated that in an alternate embodiment, fuel injector 66 may be a port injector providing fuel into an intake port upstream of cylinder 30. It will also be appreciated that cylinder 30 may receive fuel from a plurality of injectors, such as a plurality of port injectors, a plurality of direct injectors, or a combination thereof.

Continuing with FIG. 1, intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30, among other engine cylinders, through intake passage 42 and intake manifold 44. The position of throttle plate 64 may be provided to controller 12 by throttle position signal TP. Intake passage 42 may include a mass air flow (MAF) sensor 120 and a manifold air pressure (MAP) sensor 122 for providing respective signals MAF and MAP to controller 12.

An ignition system 88 can provide an ignition spark to combustion chamber 30 via a spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

An upstream exhaust gas sensor 126 is shown coupled to exhaust passage 48 upstream of emission control device 70. Upstream sensor 126 may be any suitable sensor for providing an indication of exhaust gas AFR, such as a linear wideband oxygen sensor or UEGO; a two-state narrowband oxygen sensor or EGO; a heated EGO (HEGO); or a $NO_x$, HC, or CO sensor. In the non-limiting embodiments described herein, upstream exhaust gas sensor 126 is a UEGO sensor configured to provide output, such as a voltage signal, that is proportional to the amount of oxygen present in the exhaust gas. Controller 12 uses the output to determine the exhaust gas AFR.

Emission control device 70 is shown arranged along exhaust passage 48 downstream of exhaust gas sensor 126. In the non-limiting embodiments described herein, emission control device 70 is a three-way catalyst (TWC) configured to reduce $NO_x$ and oxidize CO and unburnt hydrocarbons. In other embodiments, however, emission control device 70 may be a $NO_x$ trap, various other emission control devices, or combinations thereof.

A second, downstream exhaust gas sensor 128 is shown coupled to exhaust passage 48 downstream of emission control device 70. Downstream sensor 128 may be any suitable sensor for providing an indication of exhaust gas AFR, such as a UEGO sensor, EGO sensor, HEGO sensor, etc. For example, downstream exhaust gas sensor 128 may be a HEGO sensor configured to indicate the relative enrichment or enleanment of the exhaust gas after passing through the catalyst. The HEGO sensor may provide output in the form of a switch point, or the voltage signal at the point at which the exhaust gas switches from lean to rich.

As shown in FIG. 1, engine system 1 may include an exhaust gas recirculation (EGR) system to route a desired portion of exhaust gas from exhaust passage 48 to intake manifold 44 via EGR passage 140. The amount of EGR provided to intake manifold 44 may be varied by controller 12 via EGR valve 142. Further, an EGR sensor 144 may be arranged within the EGR passage and may provide an indication of one or more of pressure, temperature, and oxygen concentration of the exhaust gas. Under some conditions, the EGR system may be used to regulate the temperature of the air and fuel mixture within the combustion chamber. Controller 12 is shown in FIG. 1 as a microcomputer, including microprocessor unit 102, input/output ports 104, an electronic storage medium for executable programs and calibration values shown as read-only memory chip 106 in this particular example, random access memory 108, keep alive memory 110, and a data bus. Controller 12 may receive various signals from sensors coupled to engine 10 in addition to those signals previously discussed, including measurement of inducted mass air flow (MAF) from mass air flow sensor 120, engine coolant temperature (ECT) from temperature sensor 112 coupled to cooling sleeve 114, a profile ignition pickup signal (PIP) from Hall effect sensor 118 (or other type) coupled to crankshaft 40, throttle position (TP) from a throttle position sensor, absolute manifold pressure (MAP) signal from MAP sensor 122, UEGO sensor output (UEGO) from UEGO sensor 126, and HEGO sensor output (HEGO) from HEGO sensor 128. An engine speed signal, RPM, may be generated by controller 12 from signal PIP.

Storage medium read-only memory 106 can be programmed with computer readable data representing non-transitory instructions executable by processor 102 for performing the methods described below as well as other variants that are anticipated but not specifically listed.

As described above, FIG. 1 shows only one cylinder of a multi-cylinder engine, and each cylinder may similarly include its own set of intake/exhaust valves, fuel injector(s), spark plug(s), etc.

Figure 2:
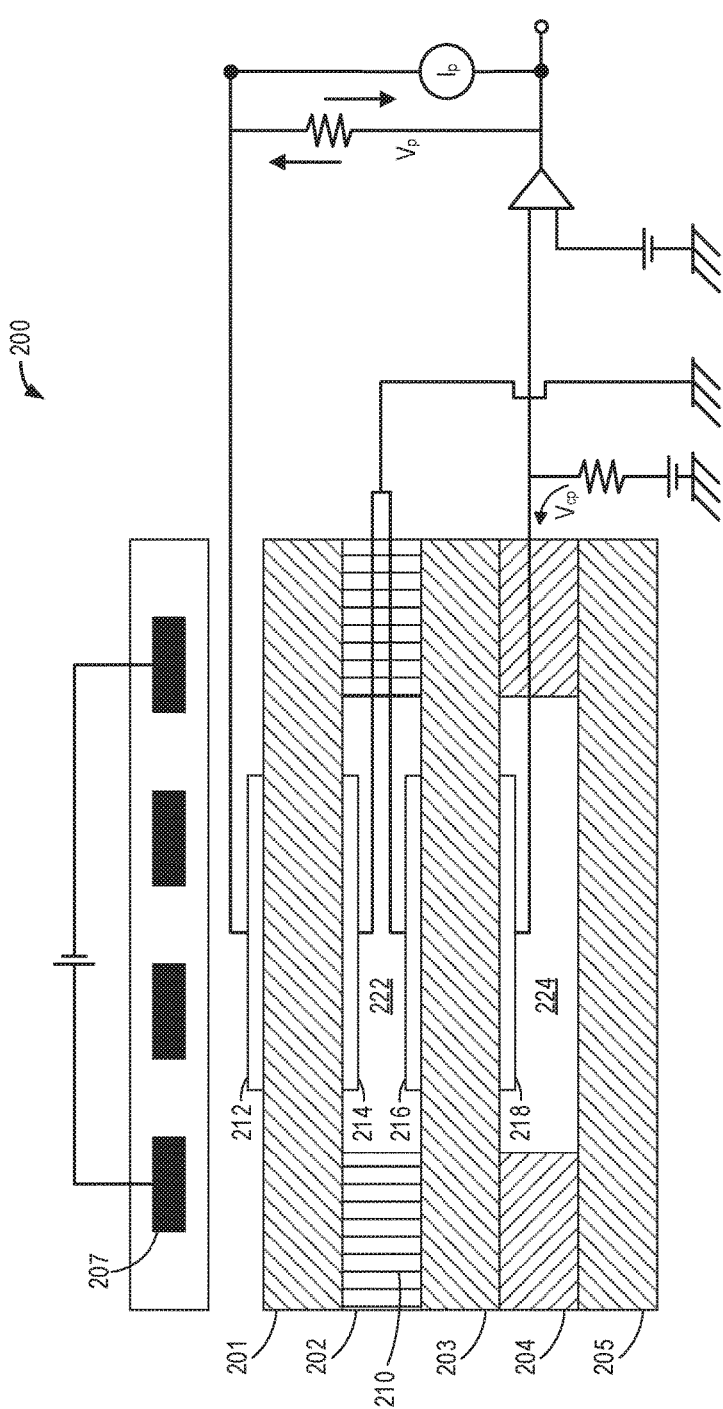
FIG. 2 shows a schematic diagram of an example oxygen sensor.
Figure 3:
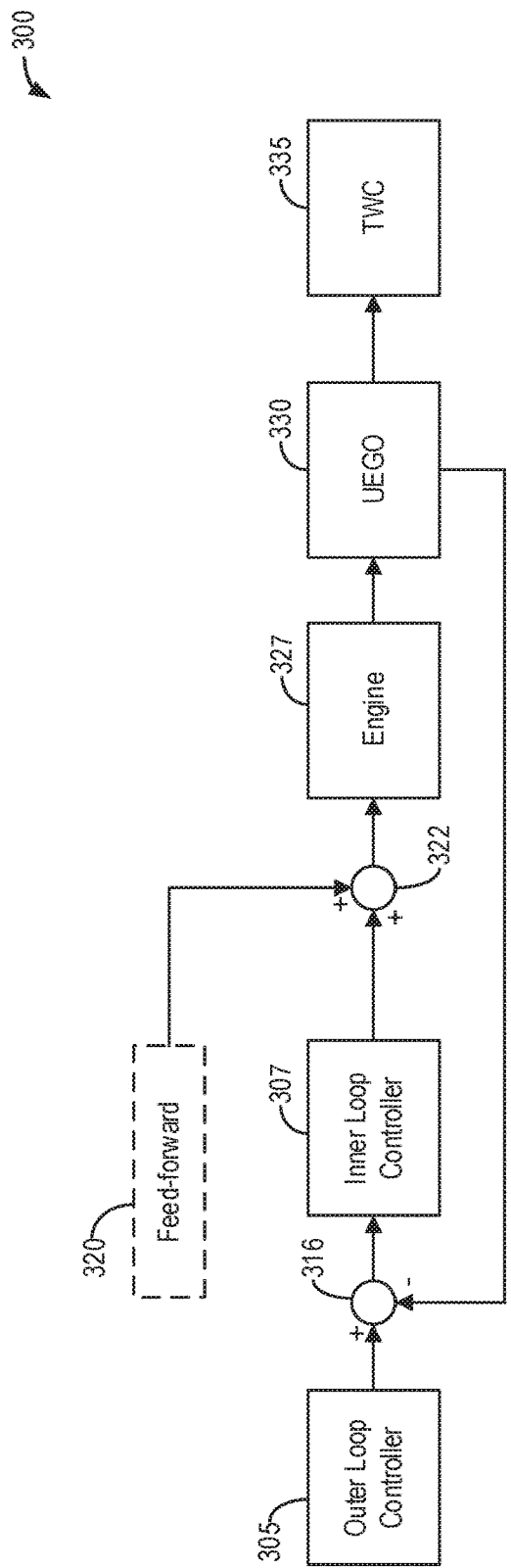
FIG. 3 shows a block diagram illustrating an example control architecture for generating a fuel command.

Next, FIG. 2 shows a schematic view of an example embodiment of an oxygen sensor 200 configured to measure a concentration of oxygen ($O_2$) in an intake airflow in an intake passage or an exhaust gas stream in an exhaust passage of an engine. Sensor 200 may operate as UEGO sensor 126 of FIG. 1, for example. Sensor 200 comprises a plurality of layers of one or more ceramic materials arranged in a stacked configuration. In the embodiment of FIG. 2, five ceramic layers are depicted as layers 201, 202, 203, 204, and 205. These layers include one or more layers of a solid electrolyte capable of conducting oxygen ions. Examples of suitable solid electrolytes include, but are not limited to, zirconium oxide-based materials. Further, in some embodiments, a heater 207 may be disposed in thermal communication with the layers to increase the ionic conductivity of the layers. While the depicted oxygen sensor is formed from five ceramic layers, it will be appreciated that the oxygen sensor may include other suitable numbers of ceramic layers.

Layer 202 includes a material or materials creating a diffusion path 210. The diffusion path 210 may be configured to allow one or more components of intake air or exhaust gas, including but not limited to a desired analyte (e.g., $O_2$), to diffuse into a first internal cavity 222 at a more limiting rate than the analyte can be pumped in or out by a pair of pumping electrodes 212 and 214. In this manner, a stoichiometric level of $O_2$ may be obtained in the first internal cavity 222.

The sensor 200 further includes a second internal cavity 224 within layer 204, which is separated from the first internal cavity 222 by layer 203. The second internal cavity 224 is configured to maintain a constant oxygen partial pressure equivalent to a stoichiometric condition. An oxygen level (e.g., concentration) present in the second internal cavity 224 is equal to the oxygen level that the intake air or exhaust gas would have if the air-fuel ratio was stoichiometric. The oxygen concentration in the second internal cavity 224 is held constant by pumping voltage $V_{cp}$. Herein, the second internal cavity 224 may be referred to as a reference cell.

A pair of sensing electrodes 216 and 218 is disposed in communication with the first internal cavity 222 and the reference cell 224. The sensing electrodes 216 and 218 detect a concentration gradient that may develop between the first internal cavity 222 and the reference cell 224 due to an oxygen concentration in the intake air or exhaust gas that is higher than or lower than the stoichiometric level. A high oxygen concentration may be caused by a lean intake air or exhaust gas mixture, while a low oxygen concentration may be caused by a rich mixture. As described herein, sealant off-gassing may also affect the concentration gradient measured by the sensing electrodes 216 and 218. For example, hydrocarbons released by the sealant may diffuse into the first internal cavity 222, diluting the oxygen concentration and causing sensor 200 to read rich. In another example, the sealant may coat sensor 200, blocking the diffusion path 210 and preventing gas components, such as $O_2$, from exiting the first internal cavity 222 and causing sensor 200 to read lean. This may also lead to a delayed response time of sensor 200. For example, if the exhaust gas transitions from a lean to a rich composition, the coating on sensor 200 may delay the diffusion of the lean exhaust gas out of the first internal cavity 222 and the diffusion of the new, rich exhaust gas into the first internal cavity 222, causing sensor 200 to read lean even when lean fuel conditions are no longer present. Conversely, when transitioning from a rich to a lean exhaust gas composition, the coating on sensor 200 may delay the diffusion of the rich exhaust gas out of the first internal cavity 222 and the diffusion of the new, lean exhaust gas into the first internal cavity 222, causing sensor 200 to read rich even when rich fuel conditions are no longer present.

In still other examples, gas released by the sealant may react with components of the exhaust gas to change the chemical composition of the exhaust gas. This may affect the composition of the exhaust gas in several ways depending on the chemical composition of the sealant. For example, if the gas released by the sealant contains a halogen, such as chlorine (Cl) or bromine (Br), the high heat of the exhaust gas may facilitate a halogenation reaction in which a hydrogen in a hydrocarbon, already present in the exhaust gas due to combustion, is replaced by the halogen. Due to the increased mass and size of the halogen compared with the hydrogen, the diffusion rate of the halogenated hydrocarbon may be slower, causing sensor 200 to read lean. In another example, if the gas released by the sealant is an oxidant, the oxidant may react with hydrocarbons in the exhaust gas and cause sensor 200 to read lean.

The pair of pumping electrodes 212 and 214 is disposed in communication with the first internal cavity 222 and is configured to electrochemically pump a selected gas constituent (e.g., $O_2$) from the first internal cavity 222 through layer 201 and out of the sensor 200. Alternatively, the pair of pumping electrodes 212 and 214 may be configured to electrochemically pump a selected gas through layer 201 and into internal cavity 222. Herein, the pumping electrodes 212 and 214 may be referred to as an $O_2$ pumping cell.

The electrodes 212, 214, 216, and 218 may be made of various suitable materials. In some embodiments, the electrodes 212, 214, 216, and 218 may be at least partially made of a material that catalyzes the dissociation of molecular oxygen. Examples of such materials include, but are not limited to, platinum and silver.

The process of electrochemically pumping the oxygen out of or into the first internal cavity 222 includes applying a pumping voltage $V_p$ across the pumping electrode pair 212 and 214. The pumping voltage $V_p$ applied to the $O_2$ pumping cell pumps oxygen into or out of the first internal cavity 222 in order to maintain a stoichiometric level of oxygen therein. The resulting pumping current $I_p$ is proportional to the concentration of oxygen in the exhaust gas. A control system (not shown in FIG. 2) generates the pumping current signal $I_p$ as a function of the intensity of the applied pumping voltage $V_p$ required to maintain a stoichiometric level within the first internal cavity 222. Thus, a lean mixture will cause oxygen to be pumped out of the first internal cavity 222, and a rich mixture will cause oxygen to be pumped into the first internal cavity 222.

It should be appreciated that the oxygen sensor described herein is merely an example embodiment of an oxygen sensor, and that other embodiments of oxygen sensors may have additional and/or alternative features and/or designs.

The oxygen sensor output (e.g., $I_p$) may be used to adjust operation of the engine. For example, the amount of fuel delivered to cylinders of the engine may be varied using a feed-forward (e.g., based on desired engine torque, engine airflow, etc.) and/or feedback (e.g., using oxygen sensor output) approach. Turning to FIG. 3, a block diagram of a control architecture 300 that may be implemented by an engine controller, such as controller 12 of FIG. 1, for generating a fuel command is illustrated. Control architecture 300 includes an engine 327 and a UEGO sensor 330 upstream of a TWC 335. Engine 327 may correspond to engine 10 of FIG. 1, UEGO sensor 330 may correspond to UEGO sensor 126 of FIG. 1, and TWC 335 may correspond to emission control device 70 of FIG. 1, for example.

Control architecture 300 regulates the engine AFR to a set point near stoichiometry (e.g., a commanded AFR). Inner loop controller 307, comprising a proportional-integral-derivative (PID) controller, controls the engine AFR by generating an appropriate fuel command (e.g., fuel pulse width). Summing junction 322 optionally combines the fuel command from inner loop controller 307 with commands from a feed-forward controller 320. This combined set of commands is delivered to the fuel injectors of engine 327.

UEGO sensor 330 provides a feedback signal to inner loop controller 307. The UEGO feedback signal is proportional to the oxygen content of the engine exhaust between engine 327 and TWC 335. For example, the output of UEGO sensor 330 can be used to evaluate the error between a commanded (e.g., desired) AFR and an actual AFR as detected by UEGO sensor 330. Under nominal UEGO sensor operating conditions (e.g., an exhaust temperature is greater than a minimum temperature required for UEGO operation and less than a threshold temperature for sealant off-gassing to occur), such an error may be due to fuel injector and/or air metering errors, for example, due to fuel injector degradation or MAF sensor degradation, respectively.

An outer loop controller 305 generates a UEGO reference signal provided to inner loop controller 307. The UEGO reference signal corresponds to a UEGO output indicative of the commanded AFR. The UEGO reference signal is combined with the UEGO feedback signal at junction 316. The error or difference signal provided by junction 316 is then used by inner loop controller 307 to adjust the fuel command to drive the actual AFR within engine 327 to the desired AFR. Outer loop controller 305 may be any reasonable controller containing an integral term, such as a proportional-integral (PI) controller.

In this way, the engine controller can accurately control the AFR of the engine based on UEGO sensor feedback and adaptively learn fuel injector and/or air metering errors, which can then be compensated for by adjusting the fuel command until the actual AFR of the engine reaches the desired AFR. For example, if the UEGO sensor reads rich, the amount of fuel delivered will be reduced. Conversely, if the UEGO sensor reads lean, the amount of fuel delivered will be increased. However, UEGO sensor degradation due to sealant off-gassing may result in UEGO sensor feedback that does not reflect the actual AFR of the engine, thereby degrading fuel control.

Figure 4:
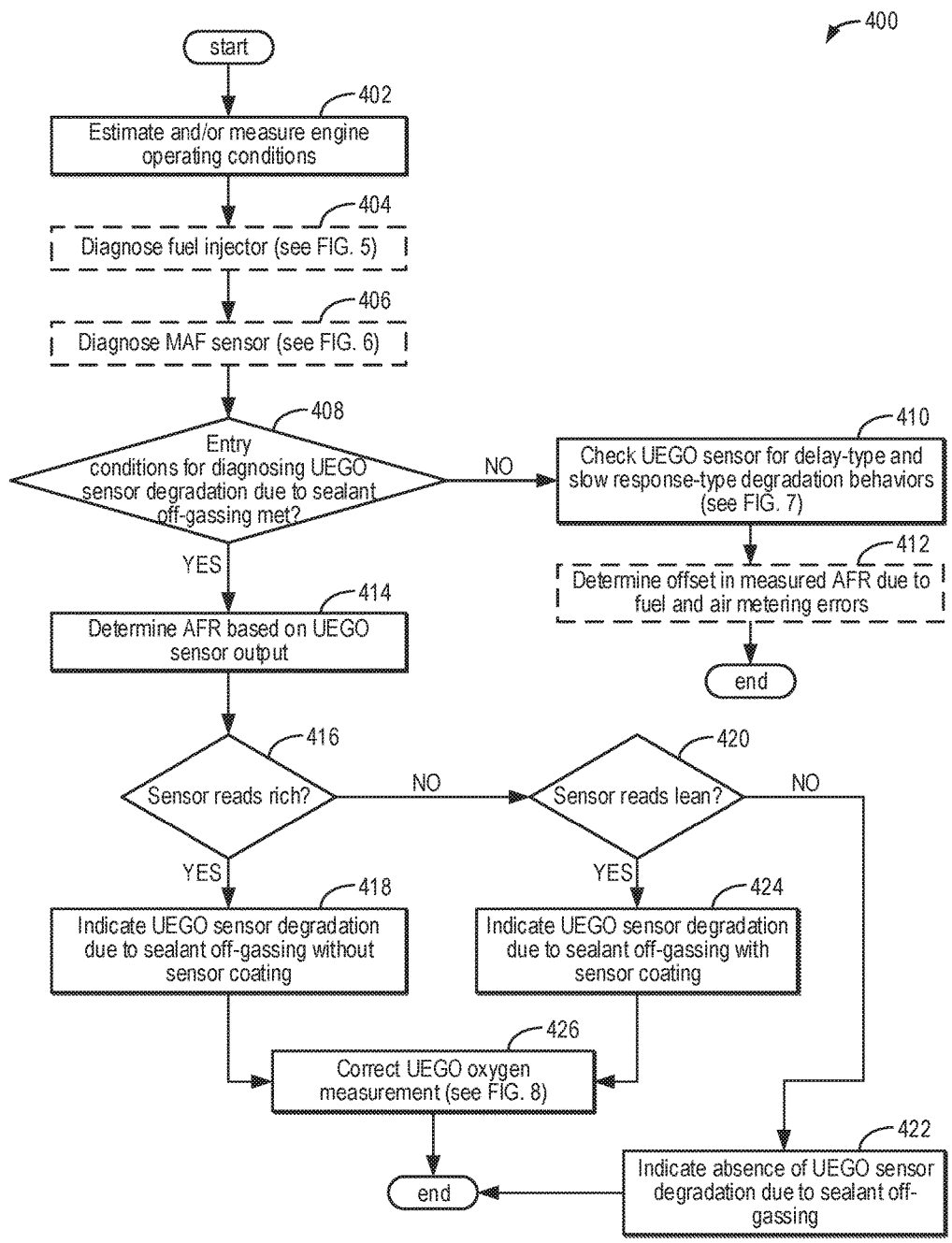
FIG. 4 shows a high-level flow chart illustrating an example method for detecting UEGO sensor degradation due to sealant off-gassing.

FIG. 4 shows a high-level flow chart illustrating an example method for determining UEGO sensor degradation due to sealant off-gassing in an engine system (e.g., engine system 1 of FIG. 1), which may then be corrected using a compensation algorithm (as will be described with respect to FIG. 8). Further, other sources of degradation in the engine system that may obscure the determination of off-gassing, such as fuel injector degradation and MAF sensor degradation, may be ruled out. Instructions for carrying out method 400 and the rest of the methods included herein may be executed by a controller (e.g., controller 12 of FIG. 1) based on instructions stored on a memory of the controller and in conjunction with signals received from sensors of the engine system, such as the sensors described above with reference to FIG. 1 (e.g., UEGO sensor 126 of FIG. 1). The controller may employ engine actuators of the engine system to adjust engine operation according to the methods described below.

Method 400 begins at 402 and includes estimating/measuring engine operating conditions. Operating conditions may be estimated, measured, and/or inferred based on available data and may include a commanded AFR, an exhaust gas temperature, engine speed and load, an amount of driver-demanded torque, fuel usage, etc.

At 404, method 400 optionally includes diagnosing one or more fuel injectors, as will be described with respect to FIG. 5. For example, a fuel injector that is degraded and delivering more fuel than commanded may result in the engine running rich. Conversely, a fuel injector that is degraded and delivering less fuel than commanded may result in the engine running lean. Thus, it may be beneficial to rule out these possibilities in order to determine if the UEGO sensor reading rich or lean is due to sealant off-gassing without or with sensor coating, respectively, as described below.

At 406, method 400 optionally includes diagnosing a MAF sensor (e.g., MAF sensor 120 of FIG. 1), as will be described with respect to FIG. 6. For example, if the MAF sensor over-reports airflow into the engine, the commanded amount of fuel may be greater than what is appropriate for the actual amount of air and the desired AFR, causing the engine to run rich. In another example, if the MAF sensor under-reports airflow into the engine, the commanded amount of fuel may be less than what is appropriate for the actual amount of air and the desired AFR, causing the engine to run lean. As with fuel injector degradation, it may be beneficial to rule out MAF sensor degradation in order to determine UEGO sensor degradation due to sealant off-gassing and/or coating with high confidence.

As an alternative to diagnosing the one or more fuel injectors at 404 and the MAF sensor at 406, the controller may utilize adaptive learning of AFR offsets caused by degraded fuel injectors or a degraded MAF sensor, as described with respect to FIG. 3 and as will be further described at 412.

At 408, method 400 includes determining if entry conditions for diagnosing UEGO sensor degradation due to sealant off-gassing are met. Entry conditions for diagnosing UEGO sensor degradation due to sealant off-gassing may include, for example, an indication of a constant driver-demanded torque (or engine load) coupled with a change in fueling demand (increased or decreased). Entry conditions for diagnosing UEGO sensor degradation due to sealant off-gassing may further include the exhaust temperature being greater than a threshold temperature. The threshold may be such that temperatures above the threshold are hot enough to cause sealant off-gassing. The exhaust temperature may be measured directly from an exhaust gas temperature sensor. Alternatively, exhaust gas temperature may be estimated based on UEGO heater power. For example, a UEGO heater, such as heater 207 of FIG. 2, may be operated using a closed-loop control strategy to maintain a constant UEGO temperature; as the exhaust temperature increases, the amount of power supplied to the UEGO heater decreases. Thus, in another example, entry conditions for diagnosing UEGO sensor degradation due to sealant off-gassing may include the UEGO heater power being less than a threshold power. Entry conditions for diagnosing UEGO sensor degradation may further include an indication that the UEGO sensor has been recently (e.g., within a predetermined time duration) repaired or replaced, or that other maintenance of exhaust system components has occurred. Further still, entry conditions for diagnosing UEGO sensor degradation may include indications that the fuel injector(s) are not degraded (as diagnosed at 404) and the MAF sensor is not degraded (as diagnosed at 406) if the adaptive learning of AFR offsets is not utilized. If the adaptive learning of AFR offsets is utilized, any errors in fuel and/or air metering may already be accounted for.

If entry conditions for diagnosing UEGO sensor degradation due to sealant off-gassing are not met, method 400 proceeds to 410 and includes checking the UEGO sensor for delay-type and slow response-type degradation behaviors, as will be described with respect to FIG. 7.

At 412, method 400 optionally includes determining an offset in a measured AFR due to fuel and air metering errors. For example, during nominal UEGO operation (e.g., the exhaust temperature is greater than a minimum temperature required for UEGO operation and less than the threshold temperature for off-gassing to occur and UEGO degradation is not indicated), discrepancies between the commanded AFR and the measured AFR may be due to fuel or air metering errors, as described with reference to FIG. 3. These errors may be long-term, and thus, the offset may be continually applied for proper fueling. Learning the offset may be beneficial for AFR control if the UEGO sensor is later determined to be degraded, will be described with respect to FIGS. 7 and 8. Further, determining the offset may be used as an alternative to determining fuel injector degradation, as described with respect to FIG. 5, and determining MAF sensor degradation, as described with respect to FIG. 6. Following 412, method 400 ends. If entry conditions for diagnosing UEGO sensor degradation due to sealant off-gassing are met at 408, method 400 proceeds to 414 and includes determining the AFR based on UEGO sensor output. For example, the AFR may be determined from a pumping current of the UEGO sensor, as described with respect to FIG. 2.

At 416, method 400 includes determining if the UEGO sensor reads rich. Determining that the UEGO sensor reads rich may include the UEGO sensor pumping current being below a first threshold amount. If the UEGO sensor reads rich, method 400 proceeds to 418 and includes indicating UEGO sensor degradation due to sealant off-gassing without sensor coating. For example, hydrocarbons released through sealant off-gassing may cause the UEGO sensor to read rich even if a rich fuel condition is not present. However, due to the use of UEGO sensor output as feedback for AFR control, fueling demand may be decreased, with less fuel delivered than needed for the engine operating conditions (e.g., requested torque and engine speed), as described with respect to FIG. 3. Indicating UEGO sensor degradation due to sealant off-gassing without sensor coating may include logging the results at the controller. However, since off-gassing may be temporary (e.g., taking place during high exhaust temperatures and while the sealant contains gasses to emit), a driver of the vehicle may not be informed. Following 418, method 400 proceeds to 426, as will be described below.

If the UEGO sensor does not read rich, method 400 proceeds to 420 and includes determining if the UEGO sensor reads lean. Determining that the UEGO sensor reads lean may include the UEGO sensor pumping current being above a second threshold amount. If the UEGO sensor does not read lean, method 400 proceeds to 422 and includes indicating an absence of UEGO sensor degradation due to sealant off-gassing. For example, if the UEGO sensor measurement indicates a stoichiometric AFR, sealant off-gassing may not be occurring, even if the exhaust temperature is greater than the threshold temperature. Following 422, method 400 ends.

If the sensor reads lean, method 400 proceeds to 424 and includes indicating UEGO sensor degradation due to sealant off-gassing with sensor coating. For example, if the sealant released through off-gassing coats the UEGO sensor and causes it to read lean even if a lean fuel condition is not present, then fueling demand is increased, causing more fuel to be delivered than needed for the engine operating conditions, as described with respect to FIG. 3. This may lead to high exhaust temperatures. It should be understood that off-gassing occurs prior to sensor coating, and so the UEGO sensor may have been previously indicated to be degraded due to sealant off-gassing without sensor coating (for example, at 418 of method 400). Indicating UEGO sensor degradation due to sealant off-gassing with sensor coating may include logging the results and the controller and illuminating a malfunction indicator lamp (MIL). Further, indicating UEGO sensor degradation due to sealant off-gassing with sensor coating may include indicating the reason for the MIL, for example, through a human-machine interface, to alert the drive of the vehicle of the sensor coating issue. Thus, UEGO sensor degradation due to sealant off-gassing with sensor coating may be a more severe form of UEGO sensor degradation due to sealant off-gassing than degradation without sensor coating. Method 400 then proceeds to 426.

At 426, method 400 includes correcting the UEGO oxygen measurement, as will be described with respect to FIG. 8. By correcting the UEGO oxygen measurement, the determined AFR will be accurate, and the fuel command will be adjusted accordingly. Following 426, method 400 ends.

Figure 5:
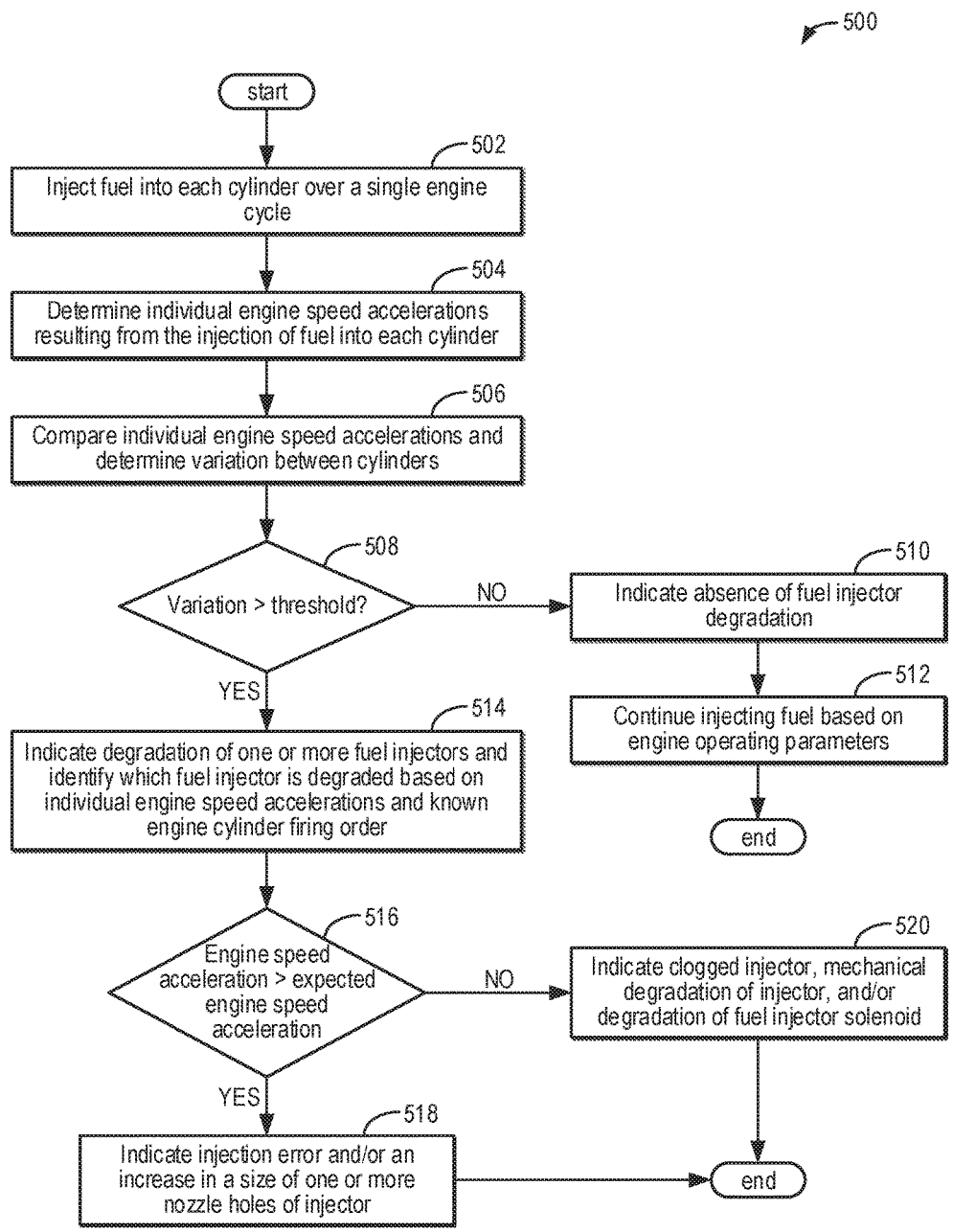
FIG. 5 shows an example method for detecting fuel injector degradation.

Turning to FIG. 5, an example method 500 for diagnosing a condition of one or more fuel injectors based on a variation in speed accelerations of an engine (e.g., engine 10 of FIG. 1) after injecting fuel into each cylinder of the engine is shown. For example, if an exhaust gas sensor (such as UEGO sensor 126 of FIG. 1) reads lean and continues to read lean despite an increase in fueling demand, the engine may not be receiving the amount of fuel requested (e.g., under-fueling), which may be due to fuel injector degradation, in particular, at exhaust temperatures below a threshold level to cause sealant off-gassing (as described with respect to FIG. 4). The UEGO sensor reading rich and continuing to read rich despite a decrease in fueling demand may also be due to the engine not receiving the amount of fuel requested (e.g., over-fueling). Thus, method 500 may be performed as part of method 400 of FIG. 4 (e.g., at 404) so that a change in fueling demand in an absence in a change in engine output demand may be conclusively attributed to UEGO sensor degradation due to sealant off-gassing. In an alternative embodiment, adaptively learning AFR offsets, as described with respect to FIG. 3 and at 412 of FIG. 4, may be used instead of determining fuel injector degradation.

Method 500 begins at 502 and includes injecting fuel into each cylinder over a single engine cycle. For example, each cylinder (e.g., cylinder 30 of FIG. 1) may receive an injection of fuel at its time in a known firing order via a corresponding fuel injector (e.g., fuel injector 66 of FIG. 1). As a result, each fuel injector may deliver fuel once in the single engine cycle.

At 504, method 500 includes determining individual engine speed accelerations resulting from the injection of fuel into each cylinder and the combustion of the air-fuel mixture. For example, engine speed may increase (e.g., accelerate) proportional to the amount of fuel injected. A controller (e.g., controller 12 of FIG. 1) may receive an engine speed signal from an engine speed sensor (such as Hall effect sensor 118 of FIG. 1) during the injection events and correlate each engine speed acceleration (e.g., each peak in engine speed) to each fuel injector/cylinder based on the known firing order of the cylinders. As a result, the controller may make a logical determination as to the individual engine speed accelerations for each fuel injector/cylinder based on logic rules that are a function of the received (e.g., measured) engine speed signal and the known firing order.

At 506, the method includes comparing the individual engine speed acceleration values for each fuel injector/cylinder and determining the variation in engine speed accelerations between the cylinders. In one example, a same amount of fuel may be injected into each cylinder via each corresponding fuel injector at 502. In another example, different amounts of fuel may be injected into each cylinder (e.g., due to variations in aging, deterioration, or degradation of performance or characteristics of the fuel injectors). However, in both examples, approximately the same engine speed acceleration response may be expected due to an amount of fuel requested for injection being the same at each cylinder. Therefore, in one example, determining the variation in the engine speed accelerations between the cylinders may include the controller calculating a standard deviation between the determined individual engine speed accelerations corresponding to each cylinder.

At 508, method 500 includes determining whether the variation determined at 506 is greater than a predetermined threshold level. In one example, the predetermined threshold level may be a level that indicates a change in performance or degradation of one or more of the fuel injectors relative to the remaining fuel injectors, as a small amount of variation (e.g., within 1.5%) between multiple injection events of the same injector or between injectors may be allowable.

If the determined variation is not greater than the threshold level, method 500 continues to 510 and includes indicating an absence of fuel injector degradation. At 512, method 500 includes continuing injecting fuel based on engine operating parameters (e.g., AFR, engine load, etc.). Alternatively, at 508, if the variation is greater than the threshold level, method 500 continues to 514 and includes indicating degradation of one or more of the fuel injectors and identifying which fuel injector (or injectors) is degraded based on the individual engine speed accelerations and the known engine cylinder firing order. For example, the controller may know the crankshaft position (e.g., angle) at which each individual engine speed acceleration occurred (from an output of a crankshaft position or speed sensor). By comparing this to the known firing order and a known crank angle at which each fuel injector of each cylinder fires, the controller may determine which individual engine speed acceleration belongs to each cylinder (and the corresponding fuel injector). The controller may then determine which engine speed acceleration deviated from the other engine speed accelerations (or an average value of all of the engine speed accelerations) and then indicate degradation of the corresponding fuel injector (e.g., the fuel injector that injected fuel corresponding to an engine speed acceleration that varied a threshold amount from the average).

At 516, method 500 includes determining if the identified engine speed acceleration resulting from injection via the indicated fuel injector is greater than an expected engine speed acceleration. In one example, the expected engine speed acceleration may be an average engine speed acceleration of all the engine cylinders. In another example, the expected engine speed acceleration may be determined from a look-up table with the commanded fuel injection amount (or pulse width) as the input and the expected engine speed acceleration as the output. If the engine speed acceleration of the indicated fuel injector is greater than the expected engine speed acceleration, method 500 continues to 518 and includes indicating injection error and/or an increase in a size of one or more nozzle holes of the injector, as more fuel may have been injected by the identified fuel injector than intended. In one example, indicating injection error and/or an increase in a size of one or more nozzle holes of the injector may include illuminating a MIL, and may further include indicating the reason for the MIL (e.g., to service or replace the indicated fuel injector). Following 518, method 500 ends.

If the engine speed acceleration of the indicated fuel injector is not greater than (e.g., is less than) the expected engine speed acceleration, method 500 proceeds to 520 and includes indicating one or more of a clogged fuel injector, mechanical degradation of the fuel injector, and degradation of a solenoid of the fuel injector. For example, less fuel may have been delivered by the identified fuel injector than intended. In one example, indicating a clogged fuel injector, mechanical degradation of the fuel injector, and/or degradation of a solenoid of the fuel injector may include illuminating a MIL, and may further include indicating the reason for the MIL. Following 520, method 500 ends.

Figure 6:
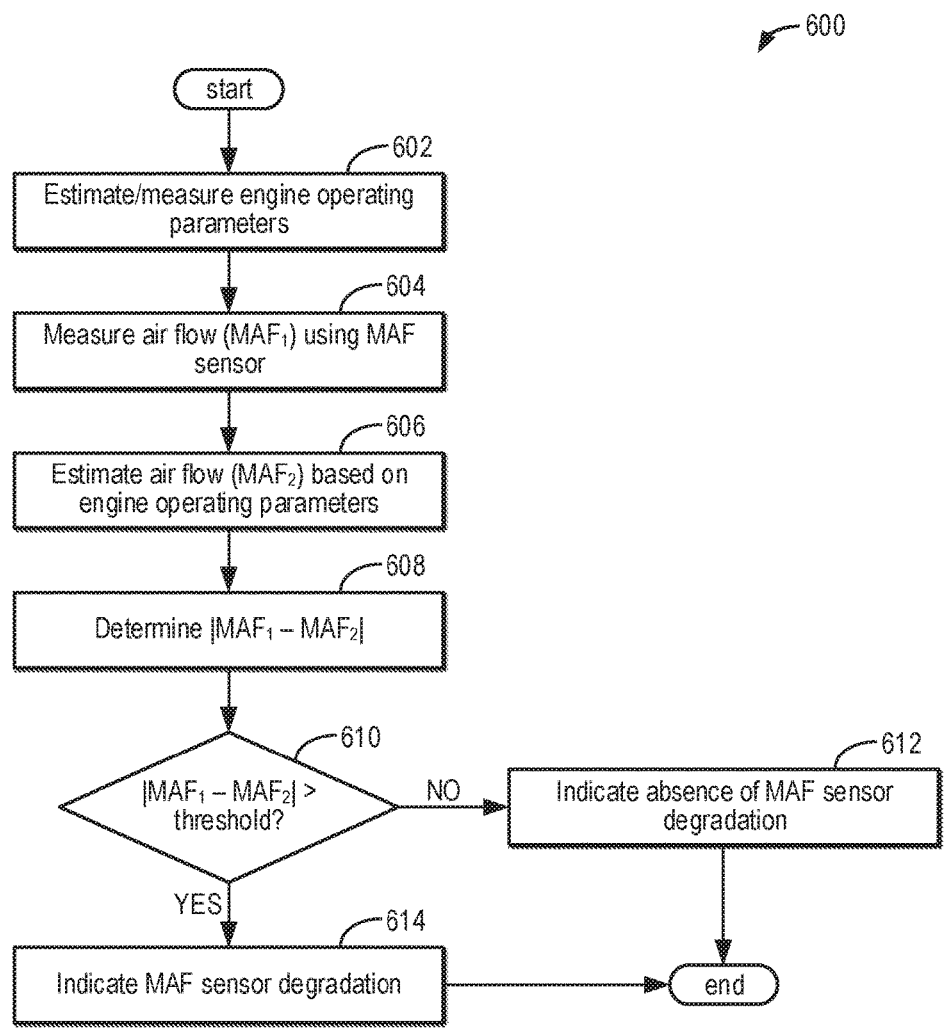
FIG. 6 shows an example method for detecting MAF sensor degradation.

FIG. 6 shows an example method 600 for diagnosing a mass air flow sensor (such as MAF sensor 120 of FIG. 1) positioned to measure an amount of air entering an engine (e.g., engine 10 of FIG. 1) in a vehicle (e.g., vehicle 5 of FIG. 1). Method 600 may be carried out by instructions stored in the memory of a controller, such as controller 12 of FIG. 1, to determine if the amount of air entering the engine indicated by the MAF sensor is accurate. For example, a MAF sensor that over-reports or under-reports airflow into the engine will cause the engine to run rich or lean, respectively, which may confound the diagnosis of UEGO sensor degradation due to sealant off-gassing (with or without subsequent sensor coating). Thus, method 600 may be performed as part of method 400 of FIG. 4 (e.g., at 406) so that a change in fueling demand in an absence of a change in engine output demand may be conclusively attributed to UEGO sensor degradation due to sealant off-gassing. In an alternative embodiment, adaptively learning AFR offsets, as described with respect to FIG. 3 and at 412 of FIG. 4, may be used instead of determining MAF sensor degradation.

Method 600 begins at 602 and includes estimating and/or measuring engine operating parameters. The engine operating parameters may include engine speed and load, barometric pressure, MAP and MAF, engine and/or manifold temperature, throttle position, driver requested torque, etc. Operating conditions may be measured or inferred based on available data.

At 604, method 600 includes measuring air flow ($MAF_1$) using the MAF sensor. For example, the raw MAF sensor output may be converted to an air flow value using a MAF transfer function.

At 606, method 600 includes estimating air flow ($MAF_2$) based on the engine operating parameters. For example, $MAF_2$ may be calculated, at least in part, by inputting engine speed (as measured by a crankshaft position sensor, such as Hall effect sensor 118 of FIG. 1), MAP (as measured by a manifold air pressure sensor, such as MAP sensor 122 of FIG. 1), and intake air temperature into an equation. Further, the calculation of $MAF_2$ may include engine displacement and volumetric efficiency as inputs in the equation. In another example, throttle position (e.g., as determined from a throttle position sensor) may be included in the calculation of $MAF_2$.

At 608, method 600 includes calculating the absolute value of the difference between $MAF_1$ and $MAF_2$. Thus, the difference between the measured air flow, $MAF_1$, and the estimated air flow, $MAF_2$ is determined.

At 610, method 600 includes determining if the absolute value of the difference between $MAF_1$ and $MAF_2$ is greater than a threshold. By using the absolute value, the magnitude of the difference and not the sign (positive or negative) is used for determining if the difference is greater than the threshold. The threshold may be a predetermined value set such that at values greater than the threshold, it may be determined that $MAF_1$ and $MAF_2$ are not in agreement.

If the absolute value of the difference between $MAF_1$ and $MAF_2$ is not greater than the threshold (e.g., the difference is less than or equal to the threshold), method 600 proceeds to 612 and includes indicating an absence of MAF sensor degradation. For example, measurements made by the MAF sensor may be considered reliable for determining an amount of fuel to deliver to the engine for a desired AFR. Following 612, method 600 ends.

If the absolute value of the difference between $MAF_1$ and $MAF_2$ is greater than the threshold, method 600 proceeds to 614 and includes indicating MAF sensor degradation. Indicating MAF sensor degradation may include illuminating a MIL and may further include communicating the reason for the MIL to a driver of the vehicle. Further, the controller may estimate air flow, as described at 606, and use the estimated air flow value (instead of the value measured by the degraded MAF sensor) in determining the amount of fuel to deliver to the engine for the desired AFR. Following 614, method 600 ends.

Figure 7:
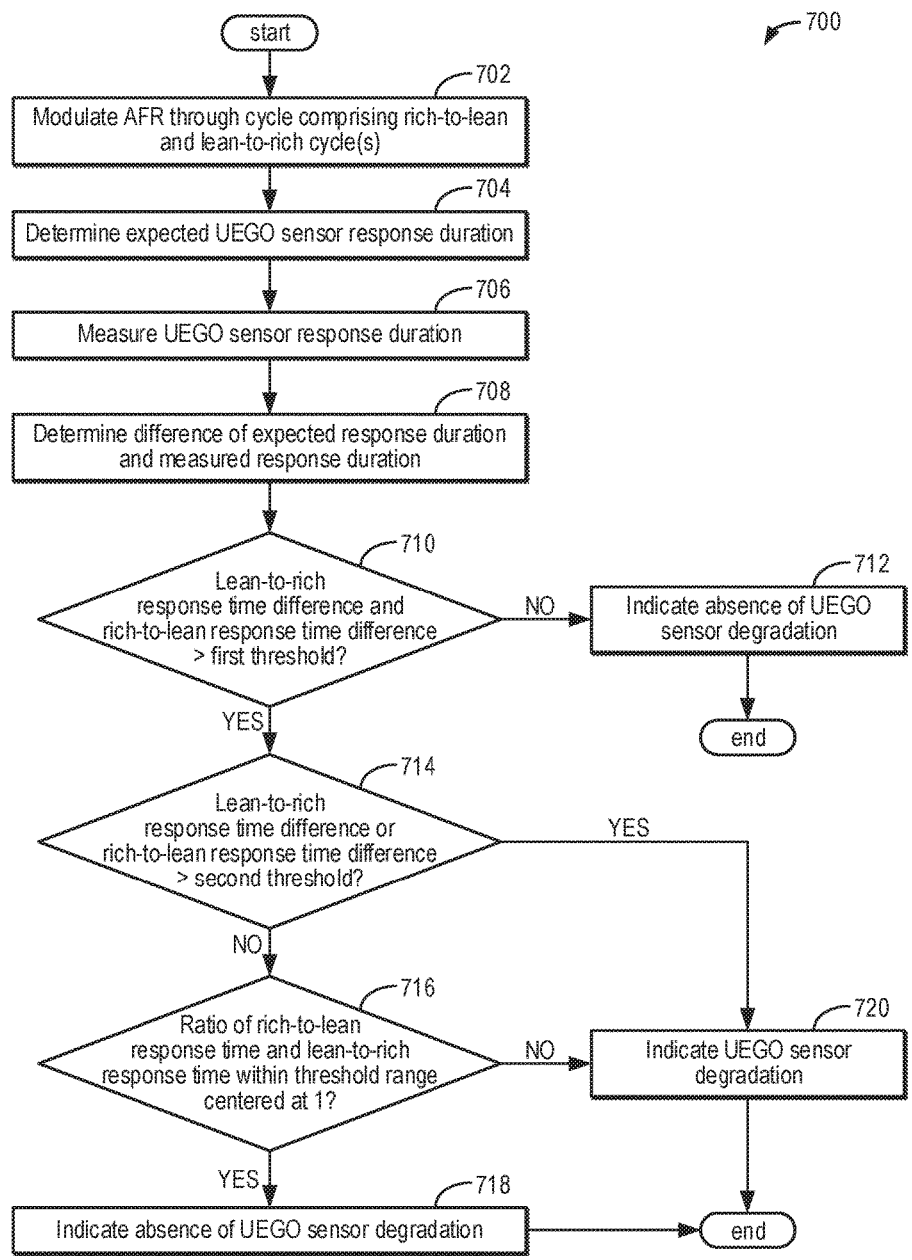
FIG. 7 shows an example method for detecting UEGO sensor delay-type and slow response-type degradation behaviors.

FIG. 7 shows an example method 700 for diagnosing UEGO sensor degradation, for example, due to sensor aging. The degradation behavior exhibited by a UEGO sensor due to sealant off-gassing (and subsequently, sensor coating) is distinct from generic UEGO sensor degradation; sealant off-gassing may lead to a rapid change, whereas generic degradation may lead to gradual changes over time. For example, symmetric and asymmetric delays in initial exhaust gas sensor response as well as symmetric and asymmetric slow response when transitioning from rich-to-lean and/or lean-to-rich exhaust gas indicate generic UEGO sensor degradation. These degradation response patterns may be referred to as "six-pattern faults." Method 700 may help enable generic UEGO sensor degradation to be distinguished from degradation due to off-gassing and may be performed as part of method 400 of FIG. 4 (such as at 410) responsive to entry conditions for diagnosing UEGO sensor degradation due to sealant off-gassing not being met, for example. Further, method 700 may be performed periodically (e.g., once a duration has elapsed since the method was previously executed) to check for generic UEGO sensor degradation.

Method 700 begins at 702 and includes modulating the AFR of gas exhausted by an engine (e.g., engine 10 of FIG. 1) of a vehicle (e.g., vehicle 5 of FIG. 1) through at least one cycle comprising a rich-to-lean transition and a lean-to-rich transition. Control commands may be generated by an engine control unit (e.g., controller 12 of FIG. 1) or by a dedicated controller and sent to the engine control unit to adjust fuel injection (e.g., the pulse-width of signal FPW sent to driver 68 of FIG. 1) to adjust fuel amount entering the cylinders of the engine and/or one or more of valve (e.g., intake valve 52 of FIG. 1) and throttle (e.g., throttle 62 of FIG. 1) operation to control air entering the cylinders of the engine. In one example, the commanded AFR modulation is an intrusive lambda square wave. The AFR may be modulated through enough rich-to-lean and lean-to-rich transitions for sufficient response time statistics to be accumulated. For example, the AFR may be modulated through six rich-to-lean and lean-to-rich cycles in order to collect a suitable amount of data to make a degradation determination.

In some embodiments, the air/fuel ratio may be modulated when transition into (entering) or out of (exiting) a deceleration fuel shut-off (DFSO) condition. The vehicle may enter DFSO responsive to a vehicle operator pedal position (e.g., in response to a driver tip-out) and where the vehicle deceleration is greater than a threshold amount. By taking advantage of AFR modulation during DFSO, intrusive AFR modulation may be reduced, thereby reducing or eliminating adverse impacts on emissions and vehicle drivability.

Note that during modulation of the AFR between rich and lean, if the vehicle operator requests to change engine operating conditions (e.g., based on pedal position), the modulation may be suspended until operating conditions are again suitable for determining UEGO sensor degradation.

At 704, method 700 includes determining an expected UEGO sensor response duration (e.g., an expected amount of time for the UEGO sensor to respond to the commanded change in AFR). The expected response duration may be the sum of a duration (delay time) from the commanded change in AFR to the initial sensor response and a weighted slew time for the sensor output to change by a calibrated amount for the change in the commanded AFR. The delay time between the change in the commanded AFR and the initial UEGO sensor response may be determined from several sources of delay. First, there is a delay contribution from the time of fuel injection to the time of exhaust, which may be proportional to the inverse of the engine speed. Second, there is a delay contribution from the time for the exhaust gas to travel from the engine cylinders to the exhaust gas sensor, which may vary with the inverse of the velocity or air mass flow rate of gas in the exhaust passage. Finally, there are delay contributions induced by processing times, the filtering applied to the exhaust gas sensor signal, etc., which are nearly constant. The weighted slew time may be determined from the velocity of the exhaust gas, which affects the rate at which the exhaust gas diffuses into the UEGO sensor (e.g., such as through diffusion path 210 of sensor 200 of FIG. 2). Further, the slew time may vary with the magnitude of the AFR step applied, with the slew time increasing as the magnitude of the step increases.

At 706, method 700 includes measuring the UEGO sensor response duration. For example, the measured delay time and the measured weighted slew time for the UEGO sensor response are used to calculate the UEGO sensor response duration.

At 708, method 700 includes determining a difference of the expected response duration and the measured response duration. The difference may be determined by subtracting the response duration expected for a nominal sensor from the total response duration. Differences between the measured and expected responses may be accumulated and averaged over a number of rich-to-lean transition and lean-to-rich transition cycles in order to increase the confidence level of the response duration difference as a metric for determining degradation.

At 710, method 700 includes determining if the average lean-to-rich response time difference and the average rich-to-lean response time difference are greater than a first calibrated threshold. Small variations around the response time difference of a nominal exhaust gas sensor may not have any impact on emissions or drivability. As an example, the first threshold may be calibrated to approximately 200 milliseconds (ms), which may be the threshold at which asymmetric degradation may begin to affect the stability of engine control and impact emissions and drivability. If the average lean-to-rich response time difference and the average rich-to-lean response time difference are not greater than the first calibrated threshold, method 700 proceeds to 712 and includes indicating an absence of UEGO sensor degradation. Following 712, method 700 ends.

If the average lean-to-rich response time difference and the average rich-to-lean response time difference are greater than the first calibrated threshold, method 700 proceeds to 714 and includes determining if the average lean-to-rich response time difference or the average rich-to-lean response time difference is greater than a second calibrated threshold (a delay threshold, e.g., 600 ms). If a response time in one direction (e.g., from lean-to-rich) or both directions (e.g., lean-to-rich and rich-to-lean) is greater than the second calibrated threshold, method 700 proceeds to 722 and includes indicating UEGO sensor degradation. For example, a response time delay in one direction is an asymmetric delay, whereas a response time delay in both directions is a symmetric delay. Indicating UEGO sensor degradation may include setting a diagnostic trouble code (DTC) at the controller and may further include illuminating a MIL to alert a vehicle operator to have the vehicle serviced in order to repair or replace the degraded UEGO sensor. Further, indicating UEGO sensor degradation may further include switching to an open-loop fuel control strategy that does not rely on UEGO sensor feedback. For example, fuel amount may be determined using a feed-forward controller (e.g., feed-forward controller 320 of FIG. 3). Further, any learned offsets due to fuel and/or air metering errors (for example, as learned at 412 of FIG. 4) may be used in generating the fuel command. Following 722, method 700 ends.

Returning to 714, if the average lean-to-rich response time difference or the average rich-to-lean response time difference is not greater than the second calibrated threshold, method 700 proceeds to 716. At 716, method 700 includes determining if a ratio of the average rich-to-lean response time difference and the average lean-to-rich response time difference is within a threshold range centered at one. If the ratio of the average rich-to-lean response time difference and the average lean-to-rich response time difference is equal to one, the average rich-to-lean response time difference and the average lean-to-rich response time difference are equal. Therefore, the threshold range defines a range in which the response time differences are symmetric (e.g., occurring in both directions). Departure from the threshold range corresponds to the response time difference being greater in one direction than the other, for example, if the UEGO sensor response time is more delayed from nominal sensor response time when transitioning from lean-to-rich than from rich-to-lean. Symmetric-type degradation has little emissions and drivability impact unless accompanied by a large delay (e.g., response time differences are beyond the second calibrated threshold, as determined at 714). However, asymmetric-type degradation may have a significant impact on emissions even when the delay is small because it may bias the air/fuel control. Thus, for intermediate values of the average response time difference (e.g., the response time is between the first calibrated threshold and the second calibrated threshold), it may be determined how much asymmetry is present for a given AFR modulation response cycle.

If the ratio of the average rich-to-lean response time difference and the average lean-to-rich response time difference is not within the threshold range, method 700 proceeds to 722 and includes indicating UEGO sensor degradation, as described above. If the ratio of the average rich-to-lean response time difference and the average lean-to-rich response time difference is within the threshold range, method 700 proceeds to 720 and includes indicating an absence of UEGO sensor degradation. Following 720, method 700 ends.

Thus, method 700 may permit a single response duration parameter (comprised of both a delay time and a weighed slew time) to be used as a pass/fail metric to diagnose generic degradation of a UEGO sensor based on six discreet degradation behavior types (e.g., symmetric delay, rich-to-lean asymmetric delay, lean-to-rich asymmetric delay, symmetric slow response, rich-to-lean asymmetric slow response, and lean-to-rich asymmetric slow response). Further, the six discreet degradation behavior types are all distinct from the rapid change in UEGO sensor response caused by sealant off-gassing. Note that a UEGO sensor exhibiting one of the six-pattern faults may also exhibit degradation due to sealant off-gassing.

Figure 8:
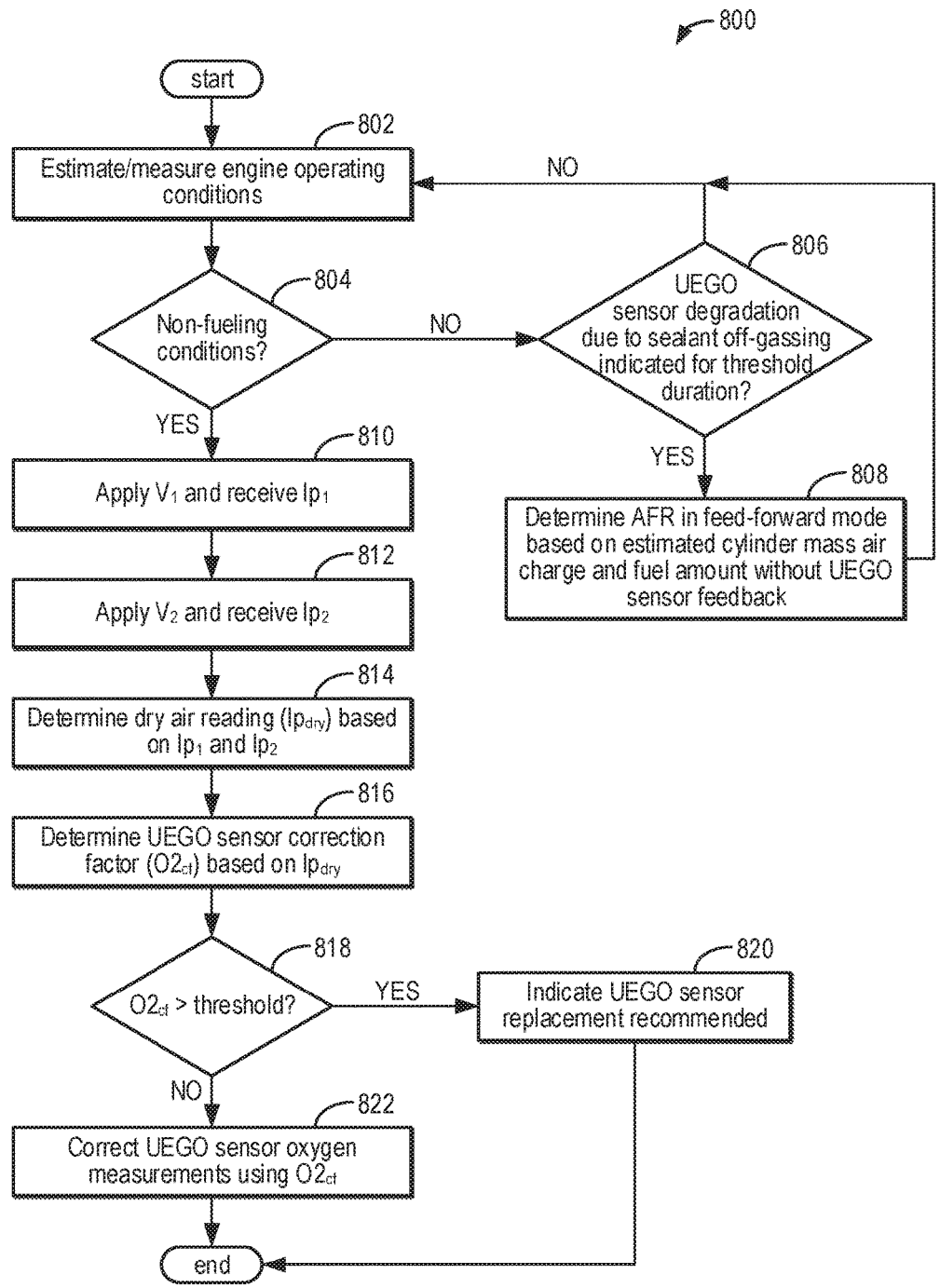
FIG. 8 shows a flow chart illustrating an example method for correcting a UEGO sensor measurement responsive to an indication of UEGO sensor degradation due to sealant off-gassing.
Figure 9:
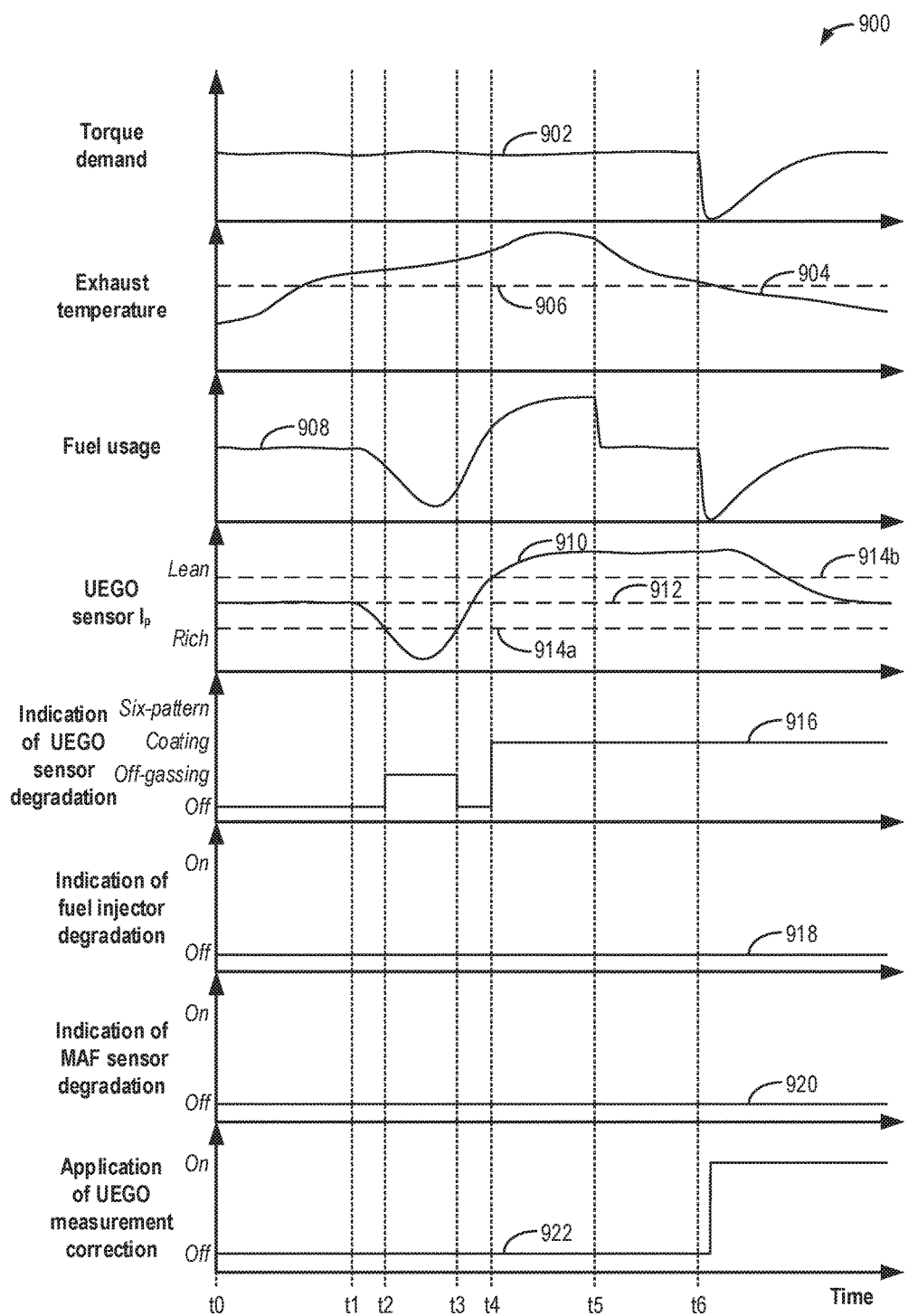
FIG. 9 shows an example timeline for detecting UEGO sensor degradation due to sealant off-gassing and applying an oxygen measurement correction.

Continuing to FIG. 8, a flow chart illustrating a method 800 for applying a measurement correction to an exhaust gas oxygen sensor, such as UEGO sensor 126 of FIG. 1, in an engine system (e.g., engine system 1 of FIG. 1) is shown. For example, method 800 may be performed by a controller (e.g., controller 12 of FIG. 1) responsive to an indication of UEGO sensor degradation due to sealant off-gassing (with or without sensor coating), as described with respect to FIG. 4. Specifically, method 800 may be executed to determine a pumping current correction factor based on voltages applied to a pumping cell of the sensor during non-fueling conditions and may be applied to correct a pumping current output of a UEGO sensor affected by sealant off-gassing. Further if the UEGO sensor output cannot be corrected, method 800 provides an option for determining the exhaust gas AFR without UEGO sensor feedback.

Method 800 begins at 802 and includes estimating and/or measuring engine operating conditions. Engine operating conditions may include, but are not limited to, a commanded AFR, an amount of EGR entering cylinders of the engine, and fueling conditions, for example.

At 804, method 800 includes determining if non-fueling conditions are present. For example, non-fueling conditions include vehicle deceleration conditions and engine operating conditions in which the fuel supply is interrupted but the engine continues spinning and at least one intake valve and one exhaust valve are operating; thus, air flows through one or more of the cylinders, but fuel is not injected in the cylinders. Under non-fueling conditions, combustion is not carried out and ambient air may move through the cylinder from the intake to the exhaust. In this way, the UEGO sensor may receive ambient air on which measurements, such as an ambient oxygen concentration measurement, may be performed.

As noted, non-fueling conditions may include, for example, DFSO. The vehicle may enter DFSO responsive to an operator pedal position (e.g., in response to a driver tip-out) and where the vehicle deceleration is greater than a threshold amount. DSFO conditions may occur repeatedly during a drive cycle, and, thus, numerous indications of the ambient oxygen measurement may be generated throughout the drive cycle, such as during each DFSO event.

Continuing with FIG. 8, if is determined that non-fueling conditions are not present, method 800 continues to 806 and includes determining if UEGO sensor degradation due to sealant off-gassing is indicated for a threshold duration. If UEGO sensor degradation due to sealant off-gassing is not indicated for the threshold duration (e.g., the degradation has been indicated for less than the threshold duration), method 800 returns to 802. In this way, the controller may continue to assess engine operating conditions until non-fueling conditions are present or the threshold duration has elapsed.

If UEGO sensor degradation due to sealant off-gassing (with or without sensor coating) is indicated for the threshold duration, method 800 proceeds to 808 and includes determining the AFR in a feed-forward mode based on an estimated cylinder mass air charge and fuel amount without UEGO sensor feedback. For example, the cylinder mass air charge may be estimated based on output from a MAF sensor (e.g., MAF sensor 120 of FIG. 1), and fuel amount may be determined from signal FPW. Further, feedback from a second exhaust gas oxygen sensor (e.g., HEGO sensor 128 of FIG. 1) downstream of a catalyst (e.g., emission control device 70 of FIG. 1) may be used. Additionally, any learned offsets due to fuel and/or air metering errors (for example, as learned at 412 of FIG. 4) may be used. Thus, determining the AFR in the feed-forward manner may be more accurate than using the output of a UEGO sensor that is known to be degraded due to sealant off-gassing. This may be particularly beneficial when the UEGO sensor reads lean for an extended period due to sensor coating. However, such operation may negatively affect the ability of the vehicle to meet emissions requirements. Therefore, following 808, method 800 returns to 802 in order to continue to assess engine operating conditions.

If non-fueling conditions are present at 804, method 800 proceeds to 810 and includes applying a first pumping voltage ($V_1$) to the oxygen pumping cell of the exhaust gas sensor and receiving a first pumping current ($Ip_1$). The first pumping voltage may have a value high enough such that oxygen is pumped from the cell but low enough such that oxygen-containing molecules such as water ($H_2O$) are not dissociated (e.g., $V_1$=450 mV). Application of the first voltage generates an output of the sensor in the form of the first pumping current ($Ip_1$), which, for a nominally functioning oxygen sensor, is indicative of the amount of oxygen in the sample gas (e.g., ambient air during non-fueling conditions). The concentration of oxygen in ambient air is a known value (e.g., 21%).

At 812, method 800 includes applying a second pumping voltage ($V_2$) to the oxygen pumping cell of the sensor receiving a second pumping ($Ip_2$) current. The second voltage may be greater than the first voltage applied to the sensor. In particular, the second voltage may have a value high enough to dissociate $H_2O$ molecules into hydrogen and oxygen (e.g., $V_2$=1.1 V). Application of the second voltage generates the second pumping current ($Ip_2$), which, for a nominally functioning oxygen sensor, is indicative of the amount of oxygen and water in the sample gas. It will be understood that the term "water" in the "amount of oxygen and water" as used herein refers to the amount of oxygen from the dissociated $H_2O$ molecules in the sample gas.

At 814, method 800 includes determining the dry air oxygen reading ($Ip_{dry}$) based on $Ip_1$ and $Ip_2$. A controller (e.g., controller 12 of FIG. 1) may input $Ip_1$ and $Ip_2$ into a function to calculate $Ip_{dry}$. For example, $Ip_{dry}$ may be calculated as: $Ip_{dry}=(Ip_2 \times 0.4)+(I_N \times 0.6)$. Thus, $Ip_{dry}$ accounts for differences in the oxygen concentration (e.g., departures from 21%) in the ambient air that may be due to differences in humidity.

At 816, method 800 includes determining a UEGO sensor correction factor ($O2_{cf}$) based on $Ip_{dry}$. The UEGO sensor correction factor is a factor that compensates for part-to-part variability of the sensor as well as degradation due to sealant off-gassing. In one example, the correction factor may be determined as a ratio of a reference sensor output (e.g., a nominal oxygen reading of a nominal UEGO sensor) and $Ip_{dry}$.

At 818, method 800 includes determining if $O2_{cf}$ is greater than a threshold. The threshold may define a correction factor above which the UEGO sensor is considered to be significantly degraded and the correction factor is unable to satisfactorily correct UEGO sensor measurements. If $O2_{cf}$ is greater than the threshold, method 800 proceeds to 820 and includes indicating that UEGO sensor replacement is recommended. Further, the controller may determine the AFR in the feed-forward mode, as described at 808, until the sensor is replaced. Following 820, method 800 ends.

If $O2_{cf}$ is not greater than the threshold (e.g., $O2_{cf}$ is less than or equal to the threshold), method 800 proceeds to 822 and includes correcting the UEGO sensor measurements using $O2_{cf}$. For example, an oxygen measurement by the UEGO sensor may be multiplied by $O2_{cf}$ to generate a corrected oxygen measurement (e.g., the amount of oxygen that would be measured by a nominal UEGO sensor). Further, if the AFR is being determined in feed-forward mode, the controller may switch back to using UEGO sensor output for determining the AFR. Following 822, method 800 ends.

Thus, based on sensor outputs (e.g., pumping currents) generated responsive to voltages applied to the oxygen pumping cell of the UEGO sensor during engine non-fueling conditions and a reference sensor output, a correction factor may be determined. By applying the correction factor to the UEGO sensor measurement during fueling conditions, a correct oxygen concentration, and therefore, a correct AFR, may be determined even if the UEGO sensor measurement is affected by sealant off-gassing. The correction factor may be updated during each non-fueling condition, as the effect of sealant off-gassing may change over time. Further, improper engine operation may be prevented by disabling the use of UEGO sensor output for determining the AFR if there is a time delay between determining that the UEGO sensor is degraded due to sealant off-gassing and determining the correction factor (e.g., due to non-fueling conditions not being present).

FIG. 9 shows a graph 900 illustrating an example of diagnosing UEGO sensor degradation due to sealant off-gassing and coating in an engine system. UEGO sensor degradation due to sealant off-gassing and coating may be determined responsive to a change in fueling demand in the absence in a change in driver-demanded torque at high exhaust temperatures (for example, according to the method of FIG. 4). Torque demand is shown at plot 902, exhaust temperature is shown at plot 904, fuel usage is shown at plot 908, UEGO sensor pumping current is shown at plot 910, an indication of UEGO sensor degradation is shown at plot 916, an indication of fuel injector degradation is shown at plot 918, and indication of MAF sensor degradation is shown at plot 920, and application of a UEGO sensor measurement correction is shown at plot 922. Furthermore, a threshold exhaust temperature is indicated by dashed line 906, a UEGO sensor pumping current equal to stoichiometry is indicated by dashed line 912 (below which, the sensor indicates rich fuel conditions, and above which, the sensor indicated lean fuel conditions), a first UEGO sensor pumping current threshold (for indicating rich fuel conditions) is indicated by dashed line 914a, and a second UEGO sensor pumping current threshold (for indicating lean fuel conditions) is indicated by dashed line 914b. For all of the above, the X-axis represents time, with time increasing from left to right. The Y-axis refers to the labeled parameter, with values increasing from bottom to top except for plot 916, in which the type of UEGO sensor degradation is given (or "off" when UEGO sensor degradation is not indicated); plot 918, in which the indication of fuel injector degradation is "off" or "on"; plot 920, in which the indication of MAF sensor degradation is "off" or "on"; and plot 922, in which the application of the UEGO sensor measurement correction is "off" or "on."

Beginning at time t0, the engine is operated with constant driver-demanded torque, as shown by plot 902. As a result of the constant torque demand, fuel usage is also constant (plot 908), and the engine is operated with a stoichiometric AFR, as indicated by the UEGO sensor pumping current (plot 910) being equal to the stoichiometric pumping current (dashed line 912). UEGO sensor degradation is not indicated (plot 916), and so the UEGO sensor measurement correction is not applied (plot 922). Further, fuel injector degradation (for example, as diagnosed by the method of FIG. 5) is not indicated (plot 918), and MAF sensor degradation (for example, as diagnosed by the method of FIG. 6) is also not indicated (plot 920). However, between time t0 and time t1, the exhaust temperature increases, as shown by plot 904, and surpasses the threshold exhaust temperature (dashed line 906), which defines a temperature above which sealant off-gassing may occur. Thus, in the example of FIG. 9, with the exhaust temperature above the threshold temperature, gasses are released from sealant used during UEGO sensor installation.

After time t1, the UEGO sensor pumping current (plot 910) decreases from stoichiometry (dashed line 912). Because the UEGO sensor output is used as feedback for generating the fuel command, fuel usage (plot 908) also decreases despite torque demand (plot 902) remaining constant. Even as the fuel usage decreases, the UEGO sensor pumping current continues to decrease, as increasing amounts of hydrocarbons released by the sealant further dilute the concentration of oxygen in the exhaust gas. At time t2, responsive to the UEGO sensor pumping current (plot 910) dropping below the first UEGO sensor pumping current threshold for indicating rich fuel conditions (dashed line 914a) in combination with the constant torque demand (plot 902), decreased fueling (908), the exhaust temperature (plot 904) being greater than the threshold exhaust temperature (dashed line 906), no indication of fuel injector degradation (plot 918), and no indication of MAF sensor degradation (plot 920), UEGO sensor degradation due to sealant off-gassing without sensor coating is indicated (plot 916).

Between time t2 and time t3, the UEGO sensor pumping current (plot 910) continues to decrease until a minimum is reached. The fuel usage (plot 908) decreases accordingly, despite torque demand (plot 902) remaining constant, and reaches a minimum a short delay after the UEGO sensor pumping current minimum is reached due to the nature of using the UEGO sensor output as feedback for the fuel command. Even though UEGO sensor degradation due to sealant off-gassing (without sensor coating) is indicated, the UEGO measurement correction (plot 922) is not applied because determination of the correction factor occurs during non-fueling conditions, and the engine remains fueled.

At time t3, responsive to the UEGO sensor pumping current surpassing the first UEGO sensor pumping current threshold for indicating rich fuel conditions (dashed line 914a), the indication of UEGO sensor degradation due to sealant off-gassing (without sensor coating) is turned off. For example, the off-gassing may be finished (e.g., all of the gas has been released from the sealant), and the UEGO sensor may go back to functioning nominally. In another example, the UEGO sensor transitions from indicating rich fuel conditions due to the sensor becoming coated with the sealant. Between time t3 and time t4, as the UEGO sensor pumping current (plot 910) increases, fuel usage (plot 908) increases accordingly. However, torque demand (plot 902) remains constant, and the exhaust temperature (plot 904) remains above the threshold exhaust temperature (dashed line 906).

At time t4, responsive to the UEGO sensor pumping current (plot 910) surpassing the second threshold pumping current for indicating lean fuel conditions (dashed line 914b), UEGO sensor degradation due to sealant off-gassing with sensor coating is indicated (plot 916). Sealant gasses released through the off-gassing have coated the sensor, causing it to read lean even though fuel usage (plot 908) is high (e.g., increased from the fuel usage at time t0 for the same torque demand). Between time t4 and time t5, the UEGO measurement correction is not applied, as indicated by plot 922, as the engine remains fueled (plot 908). The high fuel usage causes the exhaust temperature to further increase.

At time t5, a threshold duration for indicating UEGO sensor degradation due to sealant off-gassing (with or without sensor coating) without applying the UEGO measurement correction is reached. Responsive to reaching the threshold duration, AFR determination is switched to a feed-forward mode. Thus, the incorrect lean reading of the UEGO sensor (plot 910) is no longer used as feedback for generating the fuel command, and fuel usage (plot 908) decreases. With fuel usage decreased, the exhaust temperature (plot 906) also begins to decrease.

Beginning at time t6, torque demand (plot 902) rapidly decreases responsive to a driver tip-out. Fuel delivery is cut, as shown in plot 908, as the engine enters DFSO. With non-fueling conditions present, the UEGO measurement correction is learned (for example, according to the method of FIG. 8) and then applied, as indicated by plot 922. With the UEGO sensor measurement corrected, the UEGO sensor correctly reads lean due to the non-fueling conditions. The UEGO sensor pumping current (plot 910) decreases as fuel usage increases (plot 908) responsive to an increase in driver-demanded torque (plot 902). The AFR determination may be switched back to a closed-loop strategy using corrected UEGO sensor measurements. The indication of UEGO sensor degradation due to sealant off-gassing with sensor coating remains on (plot 916) even with the UEGO measurement correction applied (plot 922) and the exhaust temperature (plot 904) decreasing below the threshold temperature for causing off-gassing (dashed line 906), as sensor coating may be irreversible.

In this way, UEGO sensor degradation due to sealant off-gassing, with or without subsequent sensor coating, may be diagnosed. Further, engine control may be adjusted responsive to an indication of UEGO sensor degradation due to sealant off-gassing in order to avoid improper engine operation due to improper fueling. In one example, the AFR may be determined in a feed-forward mode instead of using feedback from the degraded UEGO sensor measurement for generating a fuel command. In another example, a measurement correction may be learned to correctly determine the AFR using the degraded UEGO sensor. Thus, an appropriate fuel command will be generated.

The technical effect of detecting UEGO sensor degradation due to sealant off-gassing is that damage to an engine and downstream components, such as a catalyst, due to improper fueling is reduced.

One example method comprises: responsive to a change in a demand for fueling an engine without a change in demand for engine output at an engine exhaust gas temperature greater than a threshold temperature, indicating degradation of an exhaust gas oxygen sensor, connected to an exhaust system of the engine with a sealant, due to sealant off-gassing; and correcting measurements of the exhaust gas oxygen sensor in response to the indication. In the preceding example, additionally or optionally, indicating degradation of the exhaust gas oxygen sensor due to sealant off-gassing further comprises indicating exhaust gas oxygen sensor degradation due to sealant off-gassing without a coating of the exhaust gas oxygen sensor when the exhaust gas oxygen sensor measures a rich air-fuel ratio of the engine exhaust gas coupled with a decreased fueling demand; and indicating exhaust gas oxygen sensor degradation due to sealant off-gassing with a coating of the exhaust gas oxygen sensor when the exhaust gas oxygen sensor measures a lean air-fuel ratio of the engine exhaust gas coupled with an increased fueling demand. In any or all of the preceding examples, additionally or optionally, indicating exhaust gas oxygen sensor degradation due to sealant off-gassing with the coating of the exhaust gas oxygen sensor further includes indicating an exhaust gas oxygen sensor replacement condition. In any or all of the preceding examples, additionally or optionally, correcting measurements of the exhaust gas oxygen sensor further comprises, during engine non-fueling conditions, operating the exhaust gas oxygen sensor at a first, lower voltage to generate a first output and at a second, higher voltage to generate a second output; determining a correction factor for the exhaust gas oxygen sensor based on the first and second outputs and a reference sensor output; and multiplying each exhaust gas oxygen sensor measurement by the correction factor. In any or all of the preceding examples, the method additionally or optionally further comprises indicating an exhaust gas oxygen sensor replacement condition and determining the air-fuel ratio of the engine exhaust gas in a feed-forward mode when the correction factor is greater than a threshold value; and responsive to non-fueling conditions not being present within a threshold duration after the indication of exhaust gas oxygen sensor degradation due to sealant off-gassing, determining the air-fuel ratio of the engine exhaust gas in the feed-forward mode. In any or all of the preceding examples, additionally or optionally, the first, lower voltage is a voltage that does not dissociate water molecules and the second, higher voltage is a voltage that dissociates water molecules. In any or all of the preceding examples, additionally or optionally, determining the air-fuel ratio of the engine exhaust gas in the feed-forward mode includes estimating a mass air charge of cylinders of the engine using output of a mass air flow sensor and estimating an amount of fuel delivered to the cylinders based on a pulse width of a signal used to actuate fuel injectors of the engine. In any or all of the preceding examples, additionally or optionally, indicating degradation of the exhaust gas oxygen sensor due to sealant off-gassing further includes confirming an absence of fuel injector degradation and mass air flow sensor degradation. In any or all of the preceding examples, additionally or optionally, indicating degradation of the exhaust gas oxygen sensor due to sealant off-gassing further includes utilizing an air-fuel ratio offset that accounts for fuel injector degradation and mass air flow sensor degradation. In any or all of the preceding examples, additionally or optionally, the air-fuel ratio offset is determined based on a difference of a commanded air-fuel ratio and an air-fuel ratio of the engine exhaust gas measured by the exhaust gas oxygen sensor when the engine exhaust gas temperature is less than the threshold temperature.

Another example method comprises: responsive to an exhaust gas oxygen sensor, coupled to an exhaust system of an engine with a sealant, measuring a rich air-fuel ratio of gas exhausted by the engine during a constant demand for engine output coupled with a decreased demand for fueling and an exhaust temperature greater than a threshold temperature, indicating exhaust gas oxygen sensor degradation due to sealant off-gassing without a coating of the exhaust gas oxygen sensor; responsive to the exhaust gas oxygen sensor measuring a lean air-fuel ratio of the gas exhausted by the engine during the constant demand for engine output coupled with an increased demand for fueling after the exhaust temperature has surpassed the threshold temperature, indicating exhaust gas oxygen sensor degradation due to sealant off-gassing with a coating of the exhaust gas oxygen sensor; and correcting measurements of the exhaust gas oxygen sensor in response to the indication of exhaust gas oxygen sensor degradation due to sealant off-gassing without the coating of the exhaust gas oxygen sensor and in response to the indication of exhaust gas oxygen sensor degradation due to sealant off-gassing with the coating of the exhaust gas oxygen sensor. In the preceding example, additionally or optionally, correcting measurements of the exhaust gas oxygen sensor further comprises, during non-fueling conditions, applying each of a first, lower voltage that does not dissociate water molecules and second, higher voltage that dissociates water molecules to the exhaust gas oxygen sensor; learning a correction factor for the exhaust gas oxygen sensor based on first and second outputs generated upon applying the first and second voltages, respectively, and a reference output; and multiplying each measurement of the exhaust gas oxygen sensor by the correction factor. In any or all of the preceding examples, additionally or optionally, correcting measurements of the exhaust gas oxygen sensor further comprises applying an air-fuel ratio offset determined prior to the exhaust gas temperature reaching the threshold temperature. In any or all of the preceding examples, the method additionally or optionally further comprises, responsive to a change in demand for engine output, determining degradation of the exhaust gas oxygen sensor due to delay and slow response. In any or all of the preceding examples, additionally or optionally, determining degradation of the exhaust gas oxygen sensor due to delay and slow response further comprises modulating the air-fuel ratio of the gas exhausted by the engine through a cycle comprising at least one rich-to-lean transition and at least one lean-to-rich transition; indicating a degradation condition of the exhaust gas oxygen sensor in response to at least one of a rich-to-lean response duration of the exhaust gas oxygen sensor and a lean-to-rich response duration of the exhaust gas oxygen sensor being greater than a delay threshold, each of the rich-to-lean response duration and the lean-to-rich response duration being a difference of an expected response duration of the exhaust gas oxygen sensor and a measured response duration of the exhaust gas oxygen sensor; and indicating the degradation condition of the exhaust gas oxygen sensor in response to a ratio of the rich-to-lean response duration to the lean-to-rich response duration being outside of a threshold range centered at one.

An example system comprises: an engine, including a plurality of cylinders; fuel injectors configured to deliver pressurized fuel to the cylinders; an intake passage for delivering air to the engine; a mass air flow (MAF) sensor coupled to the intake passage and configured to measure an amount of air entering the engine; an exhaust passage for expelling exhaust gas from the engine; an exhaust gas oxygen sensor coupled to the exhaust passage upstream of an emission control device with a sealant and configured to measure an amount of oxygen in the exhaust gas; and a controller storing instructions in non-transitory memory that, when executed, cause the controller to: determine a degradation condition of the fuel injectors; determine a degradation condition of the MAF sensor; and determine a degradation condition of the exhaust gas oxygen sensor. In the preceding example, additionally or optionally, determining the degradation condition of the exhaust gas oxygen sensor includes one or more of determining a delay and slow response-type degradation condition and determining a degradation condition due to sealant off-gassing. In any or all of the preceding examples, additionally or optionally, determining the degradation condition due to sealant off-gassing further comprises indicating exhaust gas oxygen sensor degradation due to sealant off-gassing without a coating of the exhaust gas oxygen sensor with the sealant responsive to the exhaust gas oxygen sensor measuring a rich air-fuel ratio of the exhaust gas during a constant demand for engine output coupled with a decreased demand for fueling and an exhaust temperature greater than a threshold temperature; indicating exhaust gas oxygen sensor degradation due to sealant off-gassing with the coating of the exhaust gas oxygen sensor with the sealant responsive to the exhaust gas oxygen sensor measuring a lean air-fuel ratio of the exhaust gas during the constant demand for engine output coupled with an increased demand for fueling after the exhaust temperature has surpassed the threshold temperature; and indicating an absence of exhaust gas oxygen sensor degradation due to sealant off-gassing responsive to the exhaust gas oxygen sensor measuring a stoichiometric air-fuel ratio. In any or all of the preceding examples, additionally or optionally, the controller stores further instructions in non-transitory memory that, when executed, cause the controller to: during non-fueling conditions, determine a correction factor for the exhaust gas oxygen sensor responsive to the indication of exhaust gas oxygen sensor degradation due to sealant off-gassing without the coating of the exhaust gas oxygen sensor with the sealant and responsive to the indication of exhaust gas oxygen sensor degradation due to sealant off-gassing with the coating of the exhaust gas oxygen sensor with the sealant; and apply the correction factor to each measurement of the exhaust gas oxygen sensor. In any or all of the preceding examples, additionally or optionally, determining the degradation condition due to sealant off-gassing further includes confirming an absence of fuel injector degradation and mass air flow sensor degradation.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
responsive to a change in a demand for fueling an engine without a change in demand for engine output at an engine exhaust gas temperature greater than a threshold temperature, indicating degradation of an exhaust gas oxygen sensor, connected to an exhaust system of the engine with a sealant, due to sealant off-gassing; and
correcting measurements of the exhaust gas oxygen sensor in response to the indication.

2. The method of claim 1, wherein the indicating degradation of the exhaust gas oxygen sensor due to sealant off-gassing further comprises:
indicating exhaust gas oxygen sensor degradation due to sealant off-gassing without a coating of the exhaust gas oxygen sensor when the exhaust gas oxygen sensor measures a rich air-fuel ratio of the engine exhaust gas coupled with a decreased fueling demand; and
indicating exhaust gas oxygen sensor degradation due to sealant off-gassing with a coating of the exhaust gas oxygen sensor when the exhaust gas oxygen sensor measures a lean air-fuel ratio of the engine exhaust gas coupled with an increased fueling demand.

3. The method of claim 2, wherein the indicating exhaust gas oxygen sensor degradation due to sealant off-gassing with the coating of the exhaust gas oxygen sensor further includes indicating an exhaust gas oxygen sensor replacement condition.

4. The method of claim 1, wherein the correcting measurements of the exhaust gas oxygen sensor further comprises:
during engine non-fueling conditions, operating the exhaust gas oxygen sensor at a first, lower voltage to generate a first output and at a second, higher voltage to generate a second output;
determining a correction factor for the exhaust gas oxygen sensor based on the first and second outputs and a reference sensor output; and
multiplying each exhaust gas oxygen sensor measurement by the correction factor.

5. The method of claim 4, further comprising:
indicating an exhaust gas oxygen sensor replacement condition and determining the air-fuel ratio of the engine exhaust gas in a feed-forward mode when the correction factor is greater than a threshold value; and
responsive to non-fueling conditions not being present within a threshold duration after the indication of exhaust gas oxygen sensor degradation due to sealant off-gassing, determining the air-fuel ratio of the engine exhaust gas in the feed-forward mode.

6. The method of claim 4, wherein the first, lower voltage is a voltage that does not dissociate water molecules and the second, higher voltage is a voltage that dissociates water molecules.

7. The method of claim 5, wherein determining the air-fuel ratio of the engine exhaust gas in the feed-forward mode includes estimating a mass air charge of cylinders of the engine using output of a mass air flow sensor and estimating an amount of fuel delivered to the cylinders based on a pulse width of a signal used to actuate fuel injectors of the engine.

8. The method of claim 1, wherein the indicating degradation of the exhaust gas oxygen sensor due to sealant off-gassing further includes confirming an absence of fuel injector degradation and mass air flow sensor degradation.

9. The method of claim 1, wherein the indicating degradation of the exhaust gas oxygen sensor due to sealant off-gassing further includes utilizing an air-fuel ratio offset that accounts for fuel injector degradation and mass air flow sensor degradation.

10. The method of claim 9, wherein the air-fuel ratio offset is determined based on a difference of a commanded air-fuel ratio and an air-fuel ratio of the engine exhaust gas measured by the exhaust gas oxygen sensor when the engine exhaust gas temperature is less than the threshold temperature.

11. A method, comprising:
responsive to an exhaust gas oxygen sensor, coupled to an exhaust system of an engine with a sealant, measuring a rich air-fuel ratio of gas exhausted by the engine during a constant demand for engine output coupled with a decreased demand for fueling and an exhaust temperature greater than a threshold temperature, indicating exhaust gas oxygen sensor degradation due to sealant off-gassing without a coating of the exhaust gas oxygen sensor;
responsive to the exhaust gas oxygen sensor measuring a lean air-fuel ratio of the gas exhausted by the engine during the constant demand for engine output coupled with an increased demand for fueling after the exhaust temperature has surpassed the threshold temperature, indicating exhaust gas oxygen sensor degradation due to sealant off-gassing with a coating of the exhaust gas oxygen sensor; and
correcting measurements of the exhaust gas oxygen sensor in response to the indication of exhaust gas oxygen sensor degradation due to sealant off-gassing without the coating of the exhaust gas oxygen sensor and in response to the indication of exhaust gas oxygen sensor degradation due to sealant off-gassing with the coating of the exhaust gas oxygen sensor.

12. The method of claim 11, wherein the correcting measurements of the exhaust gas oxygen sensor further comprises:
during non-fueling conditions, applying each of a first, lower voltage that does not dissociate water molecules and second, higher voltage that dissociates water molecules to the exhaust gas oxygen sensor;
learning a correction factor for the exhaust gas oxygen sensor based on first and second outputs generated upon applying the first and second voltages, respectively, and a reference output; and
multiplying each measurement of the exhaust gas oxygen sensor by the correction factor.

13. The method of claim 12, wherein the correcting measurements of the exhaust gas oxygen sensor further comprises:
applying an air-fuel ratio offset determined prior to the exhaust gas temperature reaching the threshold temperature.

14. The method of claim 11, further comprising:
responsive to a change in demand for engine output, determining degradation of the exhaust gas oxygen sensor due to delay and slow response.

15. The method of claim 14, wherein the determining degradation of the exhaust gas oxygen sensor due to delay and slow response further comprises:
modulating the air-fuel ratio of the gas exhausted by the engine through a cycle comprising at least one rich-to-lean transition and at least one lean-to-rich transition;

indicating a degradation condition of the exhaust gas oxygen sensor in response to at least one of a rich-to-lean response duration of the exhaust gas oxygen sensor and a lean-to-rich response duration of the exhaust gas oxygen sensor being greater than a delay threshold, each of the rich-to-lean response duration and the lean-to-rich response duration being a difference of an expected response duration of the exhaust gas oxygen sensor and a measured response duration of the exhaust gas oxygen sensor; and indicating the degradation condition of the exhaust gas oxygen sensor in response to a ratio of the rich-to-lean response duration to the lean-to-rich response duration being outside of a threshold range centered at one.

16. A system, comprising
an engine, including a plurality of cylinders;
fuel injectors configured to deliver pressurized fuel to the cylinders;
an intake passage for delivering air to the engine;
a mass air flow (MAF) sensor coupled to the intake passage and configured to measure an amount of air entering the engine; an exhaust passage for expelling exhaust gas from the engine;
an exhaust gas oxygen sensor coupled to the exhaust passage upstream of an emission control device with a sealant and configured to measure an amount of oxygen in the exhaust gas; and
a controller storing instructions in non-transitory memory that, when executed, cause the controller to:
determine a degradation condition of the fuel injectors;
determine a degradation condition of the MAF sensor; and
determine a degradation condition of the exhaust gas oxygen sensor
wherein the determining the degradation condition of the exhaust gas oxygen sensor includes one or more of determining a delay and slow response-type degradation condition and determining a degradation condition due to sealant off-gassing.

17. The system of claim 16, wherein the determining the degradation condition due to sealant off-gassing further comprises: indicating exhaust gas oxygen sensor degradation due to sealant off-gassing without a coating of the exhaust gas oxygen sensor with the sealant responsive to the exhaust gas oxygen sensor measuring a rich air-fuel ratio of the exhaust gas during a constant demand for engine output coupled with a decreased demand for fueling and an exhaust temperature greater than a threshold temperature; indicating exhaust gas oxygen sensor degradation due to sealant off-gassing with the coating of the exhaust gas oxygen sensor with the sealant responsive to the exhaust gas oxygen sensor measuring a lean air-fuel ratio of the exhaust gas during the constant demand for engine output coupled with an increased demand for fueling after the exhaust temperature has surpassed the threshold temperature; and indicating an absence of exhaust gas oxygen sensor degradation due to sealant off-gassing responsive to the exhaust gas oxygen sensor measuring a stoichiometric air-fuel ratio.

18. The system of claim 17, wherein the controller stores further instructions in non-transitory memory that, when executed, cause the controller to:
during non-fueling conditions, determine a correction factor for the exhaust gas oxygen sensor responsive to the indication of exhaust gas oxygen sensor degradation due to sealant off-gassing without the coating of the exhaust gas oxygen sensor with the sealant and responsive to the indication of exhaust gas oxygen sensor degradation due to sealant off-gassing with the coating of the exhaust gas oxygen sensor with the sealant; and
apply the correction factor to each measurement of the exhaust gas oxygen sensor.

19. The system of claim 17, wherein the determining the degradation condition due to sealant off-gassing further includes confirming an absence of fuel injector degradation and mass air flow sensor degradation.

* * * * *